US012563086B2

(12) United States Patent
Griffin et al.

(10) Patent No.: US 12,563,086 B2
(45) **Date of Patent: *Feb. 24, 2026**

(54) METHOD FOR CHARACTERIZING AND MANAGING VULNERABILITIES ACROSS ASSETS IN A COMPUTER NETWORK

(71) Applicant: Sevco Security, Inc., Austin, TX (US)

(72) Inventors: Aaron Griffin, Seattle, WA (US); Steven Kroh, Rochester, NY (US); Stephen Taylor, Brooklyn, NY (US); James LoRusso, IV, Milford, CT (US); Craig Cason, Troy, IL (US); Luis Diego Cabezas, Ann Arbor, MI (US); Nicholas Murdock, Glen Ellyn, IL (US); Jacob Hackett, Austin, TX (US)

(73) Assignee: Sevco Security, Inc., Austin, TX (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/758,626

(22) Filed: Jun. 28, 2024

(65) Prior Publication Data

US 2024/0356960 A1 Oct. 24, 2024

Related U.S. Application Data

(63) Continuation-in-part of application No. 18/533,039, filed on Dec. 7, 2023.

(60) Provisional application No. 63/524,544, filed on Jun. 30, 2023, provisional application No. 63/431,265, filed on Dec. 8, 2022.

(51) Int. Cl.
*H04L 9/40* (2022.01)

(52) U.S. Cl.
CPC .............................. *H04L 63/1433* (2013.01)

(58) Field of Classification Search
CPC . G06Q 40/06; G06Q 10/0635; H04L 63/1433
USPC .............................................. 726/1; 709/217
See application file for complete search history.

(56) References Cited

U.S. PATENT DOCUMENTS

| | | | | |
|---|---|---|---|---|
| 10,701,049 B2 * | 6/2020 | Murthy | ................. | H04L 63/102 |
| 11,647,027 B2 * | 5/2023 | Guy | ........................ | H04L 41/12 726/1 |
| 2014/0344452 A1 * | 11/2014 | Lipstone | ............. | H04L 41/0803 709/224 |

(Continued)

*Primary Examiner* — Liang Che A Wang
(74) *Attorney, Agent, or Firm* — Run8 Patent Group, LLC; Peter Miller; Brian Chew

(57) ABSTRACT

A method includes: storing attributes represented in objects, generated by sources during a time interval, into a container storing a set of attributes characterizing the first asset during the time interval; accessing a combination of attributes defining a first vulnerability in a set of vulnerabilities; identifying a subset of assets, including the first device, associated with the first vulnerability based on the combination of attributes represented in the set of attributes; calculating a vulnerability risk score, in a set of vulnerability risk scores, associated with the first vulnerability based on a quantity of devices in the subset of devices and a severity score assigned to the first vulnerability; selecting a subset of vulnerabilities, in the set of vulnerabilities, exhibiting highest vulnerability risk score; and generating a visualization indicating the subset of vulnerabilities, including the first vulnerability, and the quantity of devices associated with the first vulnerability.

20 Claims, 8 Drawing Sheets

(56)             References Cited

U.S. PATENT DOCUMENTS

| | | | |
|---|---|---|---|
| 2014/0344453 A1* | 11/2014 | Varney | H04L 41/50 |
| | | | 709/224 |
| 2018/0097789 A1* | 4/2018 | Murthy | H04L 63/0227 |
| 2020/0213289 A1* | 7/2020 | Murthy | H04L 63/08 |
| 2021/0157920 A1* | 5/2021 | Zheng | G06F 21/566 |
| 2022/0329604 A1* | 10/2022 | Guy | H04L 41/0893 |

* cited by examiner

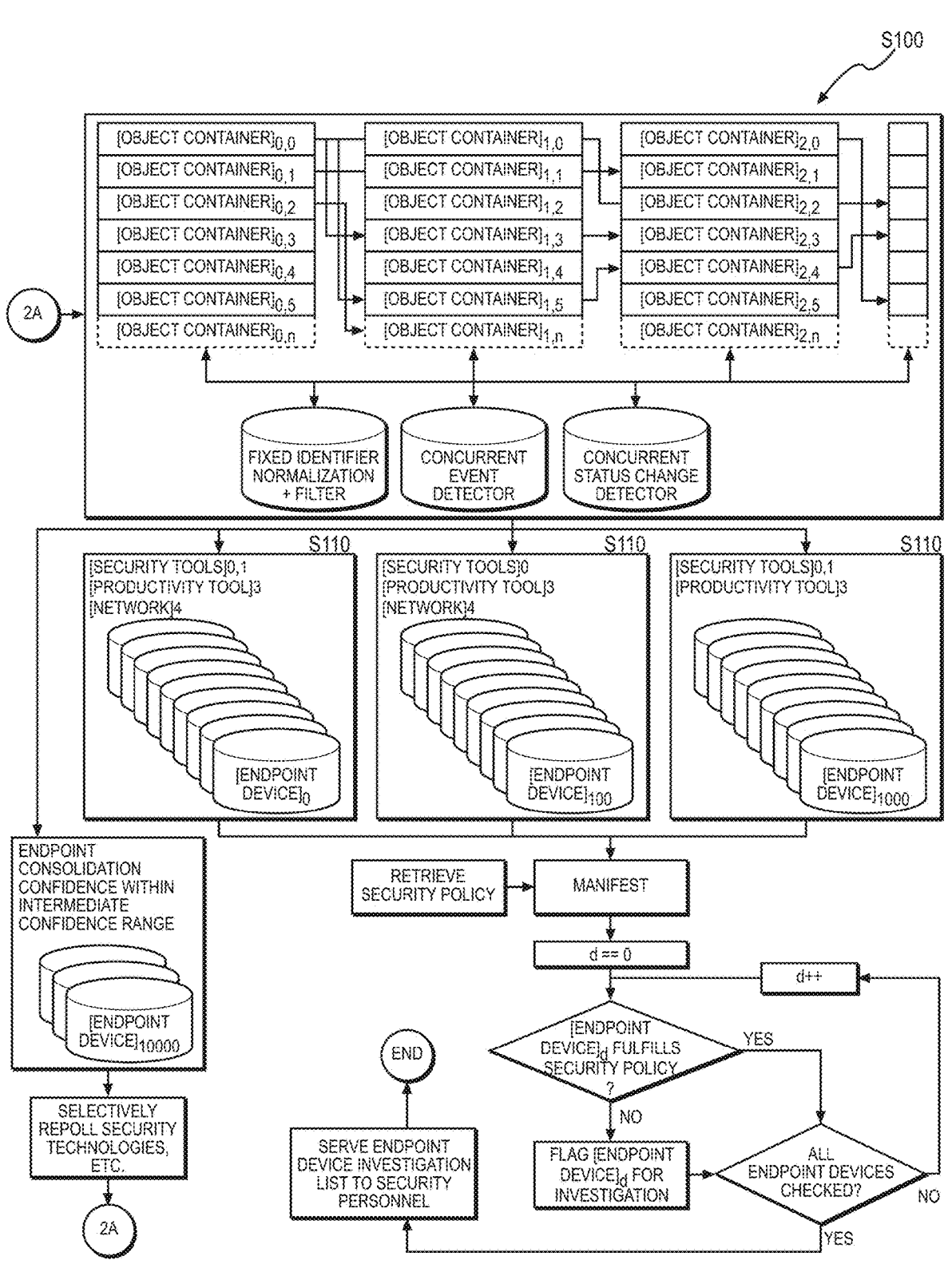

S100

[OBJECT CONTAINER]$_{0,0}$  [OBJECT CONTAINER]$_{1,0}$  [OBJECT CONTAINER]$_{2,0}$
[OBJECT CONTAINER]$_{0,1}$  [OBJECT CONTAINER]$_{1,1}$  [OBJECT CONTAINER]$_{2,1}$
[OBJECT CONTAINER]$_{0,2}$  [OBJECT CONTAINER]$_{1,2}$  [OBJECT CONTAINER]$_{2,2}$
[OBJECT CONTAINER]$_{0,3}$  [OBJECT CONTAINER]$_{1,3}$  [OBJECT CONTAINER]$_{2,3}$
[OBJECT CONTAINER]$_{0,4}$  [OBJECT CONTAINER]$_{1,4}$  [OBJECT CONTAINER]$_{2,4}$
[OBJECT CONTAINER]$_{0,5}$  [OBJECT CONTAINER]$_{1,5}$  [OBJECT CONTAINER]$_{2,5}$
[OBJECT CONTAINER]$_{0,n}$  [OBJECT CONTAINER]$_{1,n}$  [OBJECT CONTAINER]$_{2,n}$

2A

FIXED IDENTIFIER NORMALIZATION + FILTER

CONCURRENT EVENT DETECTOR

CONCURRENT STATUS CHANGE DETECTOR

S110

[SECURITY TOOLS]$_{0,1}$
[PRODUCTIVITY TOOL]3
[NETWORK]4

[ENDPOINT DEVICE]$_0$

S110

[SECURITY TOOLS]0
[PRODUCTIVITY TOOL]3
[NETWORK]4

[ENDPOINT DEVICE]$_{100}$

S110

[SECURITY TOOLS]$_{0,1}$
[PRODUCTIVITY TOOL]3

[ENDPOINT DEVICE]$_{1000}$

ENDPOINT CONSOLIDATION CONFIDENCE WITHIN INTERMEDIATE CONFIDENCE RANGE

[ENDPOINT DEVICE]$_{10000}$

SELECTIVELY REPOLL SECURITY TECHNOLOGIES, ETC.

2A

RETRIEVE SECURITY POLICY → MANIFEST $d == 0$ $d++$

[ENDPOINT DEVICE]$_d$ FULFILLS SECURITY POLICY? — YES

NO

END

SERVE ENDPOINT DEVICE INVESTIGATION LIST TO SECURITY PERSONNEL

FLAG [ENDPOINT DEVICE]$_d$ FOR INVESTIGATION

ALL ENDPOINT DEVICES CHECKED? — NO

YES

*FIGURE 2B*

S100

3A → i=1 i++

IDENTIFY ASSETS ASSOCIATED WITH [VULNERABILITY]$_i$   S140 k=1

IDENTIFY CRITICALITY OF [ASSET]$_k$

APPLY WEIGHT TO [ASSET]$_k$ BASED ON CRITICALITY

S142 CALCULATE QUANTITY OF ASSETS ASSOCIATED WITH [VULNERABILITY]$_i$ k++ k== QUANTITY OF ASSETS ASSOCIATED WITH [VULNERABILITY]$_i$ ?

S144 CALCULATE / UPDATE RISK SCORE OF [VULNERABILITY]$_i$ BASED ON WEIGHTED [ASSET]$_k$

STORE RISK SCORE OF [VULNERABILITY]$_i$ i==MAX?

ORDER VULNERABILITIES BASED ON RISK SCORE

S146 SELECT SUBSET OF VULNERABILITIES EXHIBITING HIGHEST RISK SCORE

3C

S150 S152

---

EXPOSURE MANAGEMENT   🔍 SEARCH...

MEDIUM / LOW / CRITICAL / HIGH

ASSETS TO REVIEW: 266 | NEW TODAY: 12 | ASSETS TO REMEDIATION: 129 | AVERAGE AGE: 27 DAYS | BREACHING SLAs:

| RISK | VULNERABILITY / ASSET TYPE AND CATEGORY | ASSETS CHG. LAST 7 DAYS | AVG. AGE % IN AND OUT OF SLA | STATUS |
|---|---|---|---|---|
| ☐ | AT RISK ADMIN DEVICES / 🖵 CRITICAL ASSET MONITORING | -7  9  +0 | 60% 14 DAYS 40% | 7 OPEN 1 SNOOZED 1 ACCEPTED |
| ☐ | AT RISK ADMINS / 🖳 CRITICAL ASSET MONITORING | -3  11  +1 | 60% 12 DAYS 40% | 11 OPEN |
| ☐ | US GOVERNMENT BANNED DEVICES / 🖵 ASSET DISCOVERY | 23 NO CHANGE | 0% 32 DAYS 100% | 23 ACCEPTED |
| ☐ | US GOVERNMENT BANNED SOFTWARE / 🖹 ASSET DISCOVERY | -4  9  +4 | 60% 23 DAYS 40% | 7 OPEN 2 SNOOZED |
| ☐ | USERS NOT IN 2FA/SSO (OKTA) / 🖳 AT-RISK ASSETS | 7 NO CHANGE | 0% 22 DAYS 100% | 7 OPEN |
| ☐ | ENDPOINT PROTECTION NOT MANAGED OR IN AN UNKNOWN OR BAD PROTECTION STATE / 🖵 CONTROLS MONITORING | -12  357  +8 | 0% 12 DAYS 80% | 157 OPEN 200 SNOOZ |
| ☐ | NO CONFIGURATION/PATCH MANAGEMENT / 🖵 CONTROLS MONITORING | 142  +32 | 0% 11 DAYS 80% | 105 OPEN 37 SNOOZE |
| ☐ | NO ENDPOINT PROTECTION / 🖵 CONTROLS MONITORING | -600  789  +470 | 60% 13 DAYS 40% | 789 OPEN |
| ☐ | ADMINS LOGGING INTO A BOX WHERE EPP (CS/S1) IS NOT COMMUNICATING -2 / 🖵 CRITICAL ASSET MONITORING | 208  +20 | 60% 21 DAYS 40% | 208 OPEN |
| ☐ | AT RISK EXECUTIVE STAFF DEVICES / 🖵 CRITICAL ASSET MONITORING | 12 NO CHANGE | 0% 25 DAYS 100% | 12 OPEN |
| ☐ | AT RISK EXECUTIVE STAFF USERS / 🖳 CRITICAL ASSET MONITORING | 23 NO CHANGE | 60% 21 DAYS 40% | 23 OPEN |
| ☐ | 2022 TOP ROUTINELY EXPLOITED VULNERABILITIES ACCORDING TO CISA/FVEY / ◉ VULNERABILITY MANAGEMENT | 11 NO CHANGE | 0% 22 DAYS 100% | 11 OPEN |

∨ RISK
☑ HIGH — 11
☑ MEDIUM — 9
☑ LOW — 6
☑ CRITICAL — 3

∨ ASSET TYPE
☑ DEVICES — 27
☑ USERS — 3
☑ VUNERABILITIES — 2
☑ SOFTWARE — 1

∨ CATEGORIES
☑ VUNERABILITY MANAGEMENT — 8
☑ ASSET DISCOVERY — 8
☑ CRITICAL ASSET MONITORING — 6
☑ CONTROLS MONITORING — 6
☑ AT RISK ASSETS — 2
☑ HYGIENE — 1

∨ AVERAGE AGE
☑ 15-30 DAYS — 18
☑ OVER 30 DAYS — 10
☑ 1-14 DAYS — 3

∨ SLA COMPLIANCE

METHOD FOR CHARACTERIZING AND MANAGING VULNERABILITIES ACROSS ASSETS IN A COMPUTER NETWORK

CROSS-REFERENCE TO RELATED APPLICATIONS

This Application is a continuation-in-part of U.S. patent application Ser. No. 18/533,039, filed on 7 Dec. 2023, which claims the benefit of U.S. Provisional Application No. 63/431,265, filed on 8 Dec. 2022, each of which is incorporated in its entirety by this reference.

This application claims the benefit of U.S. Provisional Application No. 63/524,544, filed on 30 Jun. 2023, which is incorporated in its entirety by this reference.

This Application is related to U.S. patent application Ser. No. 18/371,873, filed on 22 Sep. 2023, U.S. patent application Ser. No. 18/371,891, filed on 22 Sep. 2023, U.S. patent application Ser. No. 18/101,404, filed on 25 Jan. 2023, and U.S. patent application Ser. No. 17/720,163, filed on 13 Apr. 2022, each of which is incorporated in its entirety by this reference.

TECHNICAL FIELD

This invention relates generally to the field of computer network security and more specifically to a new and useful method for characterizing and managing vulnerabilities across assets in a computer network within the field of computer network security.

BRIEF DESCRIPTION OF THE FIGURES

FIGS. 2A and 2B are flowchart representations of one variation of the method;

FIGS. 3A, 3B, 3C, 3D, 3E, and 3F are flowchart representations of one variation of the method.

DESCRIPTION OF THE EMBODIMENTS

Figure 1:
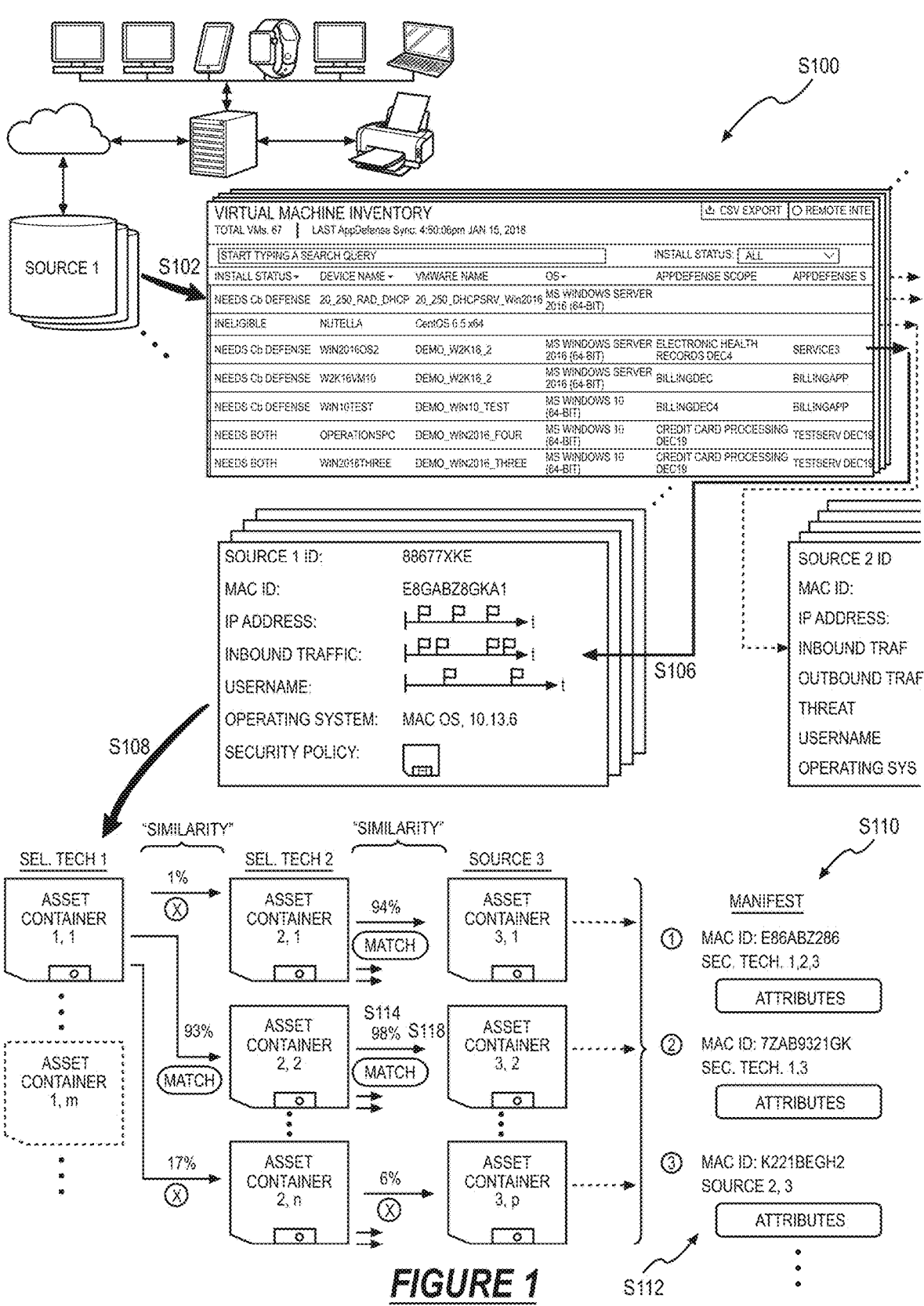
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1, 2A, 2B, 3A, and 3B, a method S100 includes: accessing a first set of objects, generated by a set of sources during a first time interval, representing attributes of a first set of assets—affiliated with a computer network—including a first set of devices in Block S102; grouping the first set of objects into a first set of object groups including a first object group representing a first device in the first set of devices in Block S106; storing attributes represented in objects in the first object group into a first device container in a set of device containers in Block S108, the first device container storing a first set of attributes characterizing the first device during the first time interval; accessing a first combination of attributes defining a first vulnerability in a first set of vulnerabilities in Block S130; identifying a first subset of devices, in the first set of devices and including the first device, associated with the first vulnerability based on the first combination of attributes represented in the first set of attributes in Block S140; calculating a first quantity of devices in the first subset of devices associated with the first vulnerability in Block S142; calculating a first vulnerability risk score, in a first set of vulnerability risk scores associated with the first set of vulnerabilities, associated with the first vulnerability based on the first quantity of devices and a first severity score assigned to the first vulnerability in Block S144; selecting a first subset of vulnerabilities, in the first set of vulnerabilities, exhibiting highest vulnerability risk score in the first set of vulnerability risk scores in Block S146; generating a first visualization indicating the first subset of vulnerabilities including the first vulnerability and the first quantity of devices associated with the first vulnerability in Block S150; and serving the first visualization to an operator via an operator interface in Block S152.

1.1 Variation: User-Based Vulnerability

As shown in FIGS. 1, 2A, 2B, 3A, and 3B, one variation of the method S100 includes: accessing a first set of objects, generated by a set of sources during a first time interval, representing attributes of a first set of assets—affiliated with a computer network—including a first set of users in Block S102; grouping the first set of objects into a first set of object groups including a first object group representing a first user in the first set of users in Block S106; storing attributes represented in objects in the first object group into a first user container in a set of user containers in Block S108, the first user container storing a first set of attributes characterizing the first user during the first time interval; accessing a first combination of attributes characterizing a first vulnerability in a first set of vulnerabilities in Block S130; identifying a first subset of users, in the first set of users and including the first user, associated with the first vulnerability based on the first combination of attributes represented in the first set of attributes in Block S140; calculating a first quantity of users in the first subset of users associated with the first vulnerability in Block S142; calculating a first vulnerability risk score, in a first set of vulnerability risk scores associated with the first set of vulnerabilities, associated with the first vulnerability based on the first quantity of users and a first severity score assigned to the first vulnerability in Block S144; selecting a first subset of vulnerabilities, in the first set of vulnerabilities, exhibiting the highest vulnerability risk score in the first set of vulnerability risk scores in Block S146; generating a first visualization indicating the first subset of vulnerabilities including the first vulnerability and the first quantity of users associated with the first vulnerability in Block S150; and serving the first visualization to an operator via an operator interface in Block S152.

1.2 Variation: Device-User-Based Vulnerability

As shown in FIGS. 1, 2A, 2B, 3A, and 3B, one variation of the method S100 includes: accessing a first set of objects, generated by a set of sources during a first time interval, representing attributes of a first set of assets—affiliated with a computer network—including a first set of devices and a first set of users in Block S102; grouping the first set of objects into a first set of object groups including a first object group representing a first device in the first set of devices in Block S106; storing attributes represented in objects in the first object group into a first device container in a set of device containers in Block S108, the first device container storing a first set of attributes characterizing the first device during the first time interval; accessing a first combination of attributes defining a first vulnerability in a first set of vulnerabilities in Block S130; accessing a first user container representing a second set of attributes characterizing a first user, in the first set of users and associated with the first device, during the first time interval in Block S118; identifying a first subset of devices, in the first set of devices and including the first device, associated with the first vulnerability based on the first combination of attributes represented in the first set of attributes and the second set of attributes in Block S140; calculating a first quantity of devices in the first subset of devices associated with the first vulnerability in Block S142; calculating a first vulnerability risk score, in a first set of vulnerability risk scores associated with the first set of vulnerabilities, associated with the first vulnerability based on the first quantity of devices and a first severity score assigned to the first vulnerability in Block S144; selecting a first subset of vulnerabilities, in the first set of vulnerabilities, exhibiting the highest vulnerability risk score in the first set of vulnerability risk scores in Block S146; generating a first visualization indicating the first subset of vulnerabilities including the first vulnerability and the first quantity of devices associated with the first vulnerability in Block S150; and serving the first visualization to an operator via an operator interface in Block S152.

2. Applications

Generally, a computer system (e.g., a local or remote computer system connected to or interfacing with a computer network) can execute Blocks of the method S100: to aggregate objects generated by various vulnerability scanners, security technologies, non-security technologies, and other tools during a first time interval; to extract attributes from these objects corresponding to each unique asset (e.g., device, application, user)—in a set of assets affiliated with a computer network—and/or each vulnerability (e.g., security vulnerability, operational vulnerability) exhibited by these assets; and to generate a manifest specifying a set of distinct vulnerabilities associated with the set of assets based on these attributes.

Accordingly, the computer system can execute Blocks of the method S100 to correlate a vulnerability with a group of assets based on a combination of attributes associated with the vulnerability and exhibited by these assets during the first time interval. Therefore, Blocks of the method S100 can be executed by the computer system to detect presence of the vulnerability on the group of assets absent direct reporting of the vulnerability on these assets by a vulnerability scanner or other technology.

For example, for each vulnerability in the manifest, the computer system can execute Blocks of the method S100 to calculate risk (e.g., a risk score) associated with the vulnerability based on severity (e.g., a severity score) associated with the vulnerability and a quantity (and/or criticality) of assets associated with the vulnerability. Then, the computer system can execute Blocks of the method S100: to select a subset of vulnerabilities in the manifest exhibiting highest risk; to generate a visualization indicating the subset of vulnerabilities, risk associated with these vulnerabilities, and quantities of assets associated with these vulnerabilities; and to serve the visualization to an operator via an operator interface.

Therefore, by generating the visualization indicating the subset of vulnerabilities exhibiting highest risk, the computer system enables the operator to prioritize remediation or mitigation of these vulnerabilities that pose greatest overall risk to the computer network.

2.1 Asset Count Change and Visualization

Additionally, the computer system can repeat Blocks of the method S100: to aggregate objects generated by various vulnerability scanners, security technologies, non-security technologies, and other tools during a second time interval; to extract attributes from these objects corresponding to each unique asset (e.g., devices, applications, users)—in a second set of assets affiliated with a computer network—and/or each vulnerability (e.g., security vulnerability, operational vulnerability) exhibited by these assets; and to generate a second manifest specifying a second set of distinct vulnerabilities associated with the second set of assets based on these attributes in order to track quantities (and identities) of assets exhibiting these vulnerabilities over a series of time intervals.

For example, the computer system can execute Blocks of the method S100: to identify a first quantity (or "count") of assets exhibiting a first vulnerability for the first time interval; to identify a second quantity of assets exhibiting the first vulnerability for the second time interval; and to calculate a change (e.g., a reduction, an increase) in quantity of assets exhibiting the first vulnerability between the first time interval and the second time interval based on a difference between the second quantity of assets and the first quantity of assets. More specifically, the computer system can execute Blocks of the method S100: to calculate a third quantity of assets newly absent the first vulnerability during the second time interval; and to calculate a fourth quantity of assets newly exhibiting the first vulnerability during the second time interval.

In this example, the computer system can execute Blocks of the method S100 to generate a visualization indicating: the second quantity of assets exhibiting the first vulnerability for the second time interval; the change (e.g., a reduction, an increase) in quantity of assets exhibiting the first vulnerability between the first time interval and the second time interval; the third quantity of assets newly absent the first vulnerability during the second time interval; and the fourth quantity of assets newly exhibiting the first vulnerability during the second time interval.

Therefore, by indicating to the operator the third and fourth quantities of assets and a net change in quantity of assets—attributed to the third quantity of assets and the fourth quantity of assets—exhibiting the first vulnerability between the first time interval and the second time interval, the computer system enables the operator to track reduction (or increase) of the first vulnerability relative to individual assets (e.g., based on the third quantity of assets and the fourth quantity of assets) and to all assets in the computer network (e.g., based on the net change in quantity assets exhibiting the first vulnerability between the first time interval and the second time interval).

2.2 Variation: Vulnerability Asset Class

As described herein, the computer system executes the method S100 to correlate vulnerabilities with assets in a set of assets across different asset classes in a set of asset classes. However, the computer system can similarly execute Blocks of the method S100: to characterize vulnerabilities as individual assets, in the set of assets, within a vulnerability class in the set of asset classes; and to correlate these vulnerability assets with other assets (e.g., device assets, application assets, user assets) across the set of asset classes (e.g., device asset class, application asset class, user asset class).

3. Terminology

Generally, an "asset" is referred to herein as a distinct entity (e.g., a physical device, a virtual device, a software application, a user) affiliated with a computer network and/or an organization.

Generally, an "attribute" is referred to herein as a value defining a property (or characteristic) of an asset.

Generally, a "container" is referred to herein as a data structure representing data objects and/or attributes.

Generally, an "environmental vulnerability" is referred to herein as a vulnerability (or exposure) characterized by a combination of attributes associated with assets in a set of asset classes (e.g., a device asset class, a user asset class, a software asset class).

Generally, a "security vulnerability" is referred to herein as a flaw or weakness in a computer network (e.g., hardware, software, processes, policies) that may be exploited to gain unauthorized access to the computer network and/or violate a security policy for the computer network.

Generally, an "operational vulnerability" is referred to herein as a flaw or weakness in the computer network that may negatively affect operation of an organization associated with the computer network.

Generally, a "remediation" is referred to herein as an action executed by an operator to (completely) remove presence of a vulnerability on the computer network (e.g., install a software update onto a device that fixes a known bug).

Generally, a "mitigation" is referred to herein as an action executed by an operator (or autonomously by the computer system) to reduce an impact of a threat based on the vulnerability (e.g., install a firewall onto the device to reduce an impact of a threat based on software—exhibiting a known bug—installed on the device).

Generally, a "database query" is referred to herein as a set of instructions (e.g., operations) representing the target attributes and executable to identify the subset of assets exhibiting these target attributes.

4. Asset Identification

Figure 2A:
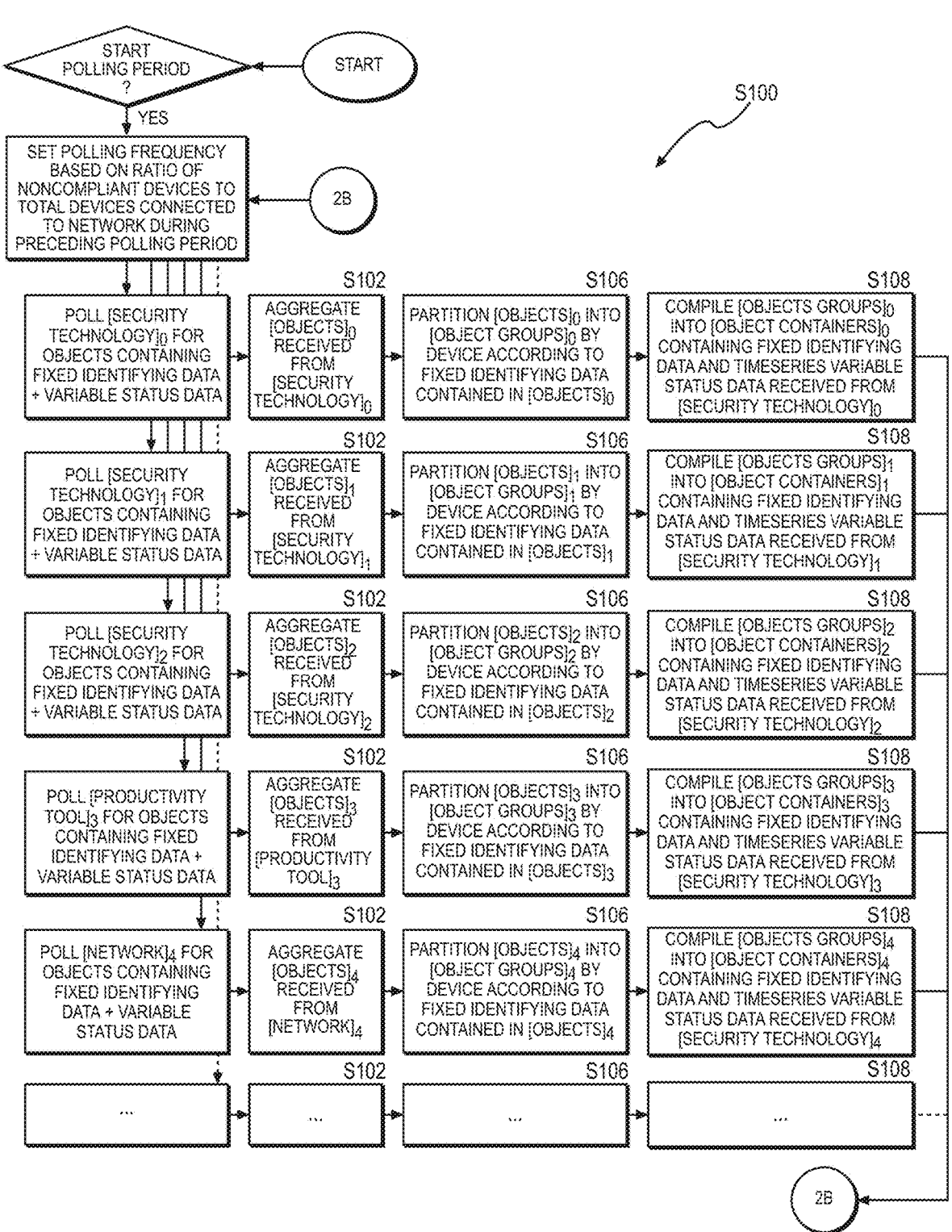

Generally, as shown in FIGS. 1, 2A, and 2B, the computer system can detect and distinguish individual assets (e.g., physical devices, virtual devices, software applications, users)—in a set of assets across a set of asset classes (e.g., a device asset class, a software asset class, a user asset class)—connected to the computer network during discrete intervals, such as by: retrieving a set of objects (and/or registration logs, etc.) published by a set of sources (e.g., security technologies, non-security technologies, human resources management tools, IT helpdesk tools, vulnerability scanners) designated for deployment on the computer network; identifying correspondence between objects (e.g., based on fixed identifying data and/or variable status data); fusing this correspondence into a manifest, for each asset class, containing one identifier for each asset represented in at least one object in this set of objects; and labeling each asset in the manifest with each source—in the set of sources—that published at least one object corresponding to the asset.

For example, the computer system can execute methods and techniques described in U.S. patent application Ser. Nos. 17/720,163, 18/371,873, and 18/371,891 to: compile disparate objects published by various security technologies deployed on devices (e.g., physical devices, virtual devices) connected to the computer network into a first manifest (or "device manifest") for the device asset class; identify all unique devices connected to the computer network during a target time interval (e.g., a past hour); and label each unique device described in the first manifest with an exact combination of tracked security technologies executing on the device during the target time interval (e.g., based on the objects—published by these security technologies during the target time interval—that indicated the device).

The computer system can implement similar methods or techniques to identify and label unique applications into a second manifest (or "application manifest") for the software asset class and to identify and label unique users in a third manifest (or "user manifest") for the user asset class.

4.1 Sources and Objects

Blocks of the method S100 recite: accessing a first set of objects, generated by a set of sources during a first time interval, representing attributes of a first set of assets affiliated with a computer network in Block S102; and grouping the first set of objects into a first set of object groups including a first object group representing a first asset in the first set of assets in Block S106.

In one implementation, in Block S102, the computer system can access a set of objects, generated by a set of sources during a target time interval (e.g., a first time interval), representing attributes of a set of assets affiliated with a computer network (and/or an organization).

For example, the computer system can: access a first subset of objects—in the set of objects and generated by a first source (e.g., a security technology) in the set of sources during the target time interval—representing attributes of a first subset of assets in the set of assets, including: a first subset of devices affiliated with the computer network during the first time interval; a first subset of applications installed on devices in the first subset of devices; and a first subset of users affiliated with the computer network during the first time interval. Then, the computer system can access a second subset of objects—in the set of objects and generated by a second source (e.g., a human resources management tool) in the set of sources during the target time interval—representing attributes of a second subset of assets, in the set of assets, including: a second subset of devices affiliated with the computer network during the first time interval; a second subset of applications installed on devices in the first subset of devices; and a second subset of users affiliated with the computer network during the first time interval.

In another implementation, in Block S106, the computer system can group (e.g., partition) these objects into a set of object groups, each object group in the set of object groups representing a particular asset in the set of assets. For example, the computer system can partition the set of objects into a first object group—in the set of object groups—representing (or associated with) a first asset (e.g., a first device, a first user) in the set of assets, each object in the first object group including fixed identifying data and/or variable status data associated with the first asset.

4.2 Asset Containers

Block S108 of the method S100 recites: storing attributes represented in objects in the first object group into a first asset container in a set of asset containers, the first asset container storing a first set of attributes characterizing the first asset during the first time interval.

Generally, the computer system can: group the set of objects into object groups, each object group corresponding to one asset (e.g., a device, a user) in Block S106; and, for each object group, store (or aggregate) objects in the object group into an asset container (e.g., a device container, an application container, a user container) including fixed identifying data (e.g., MAC address, operating system) and variable status data (e.g., an IP address, a location) representative of one unique asset in the set of assets in Block S108. More specifically, the computer system can: extract fixed identifying data and variable status data (or "attributes") from objects in an object group—published by different sources and identified by the computer system as corresponding to the same asset—and compile these data into a composite (or "singular") container representing the asset.

For example, the computer system can: detect a first IP address value (e.g., denoted "IP101.23.213.1") corresponding to a first device in a first object published by a first source; detect a second IP address value (e.g., denoted "IP_address_101.23.213.1") corresponding to the first device in a second object published by a second source; correlate the first IP address value and the second IP address value as corresponding to the first device (but in an inconsistent format and lexicon); and normalize the first IP address value and the second IP address value into a normalized IP address value. In this example, the computer system can also: detect a state value-representing a compromised state of the first device—in a third object published by the first source (which may not be captured in objects published by the second source); and detect a user identifier corresponding to the first device in a fourth object published by the second source (which may not be captured in objects published by the first source). The computer system can then compile the normalized IP address value, the state value, and the user identifier into a device container corresponding to the first device.

Accordingly, the computer system can consolidate objects—published by different sources—into one representation of fixed and variable identifying data for each unique asset, including: correlated (and normalized) data that are common across these sources; and raw data that are unique to a single source (and/or that may not be correlatable across multiple sources). Therefore, the computer system can characterize an asset with a complete set of attributes in a consistent format and lexicon.

4.2.1 Asset Attributes

In one implementation, the computer system can generate an asset container specifying attributes (e.g., fixed identifying data, variable status data) representing a corresponding asset during a target time interval. More specifically, the computer system can generate a first asset container in a set of asset containers, the first asset container including objects in a first object group (e.g., an object group associated with a first asset in a set of assets) and representing attributes of the first asset.

In one example, the computer system generates a first device container specifying a first set of device attributes (e.g., a device name, an operating system, a MAC address, an IP address, a group(s), a tag(s)) representing a first device in a set of devices.

In another example, the computer system generates a first application container specifying a first set of application attributes (e.g., an application name, an application version, a vendor, vulnerabilities, a group(s), a tag(s)) representing a first application in a set of applications.

In another example, the computer system generates a first user container specifying a first set of user attributes (e.g., a name, a login username, an employee identifier, a phone number, an email address, a latest password change, a role, a group(s), a tag(s)) of a first user in a set of users.

Generally, the computer system can store a set of asset containers in a data repository (or a set of data repositories) for storing attributes characterizing a set of assets.

In one implementation, for an asset container including a set of data of a first type (e.g., fixed identifying data) and a second set of data of a second type (e.g., variable status data, timeseries data), the computer system can: store the first set of data in a first data repository for storing the first type of data; and store the second set of data in a second data repository for storing the second type of data.

Accordingly, the computer system can store fixed data in the first data repository and variable (or timeseries) data in the second data repository, thereby preserving integrity of the fixed data in the first data repository and optimizing performance of storing (and/or updating) the variable (or timeseries) data in the second data repository.

4.2.2 Asset Associations

Figure 3A:
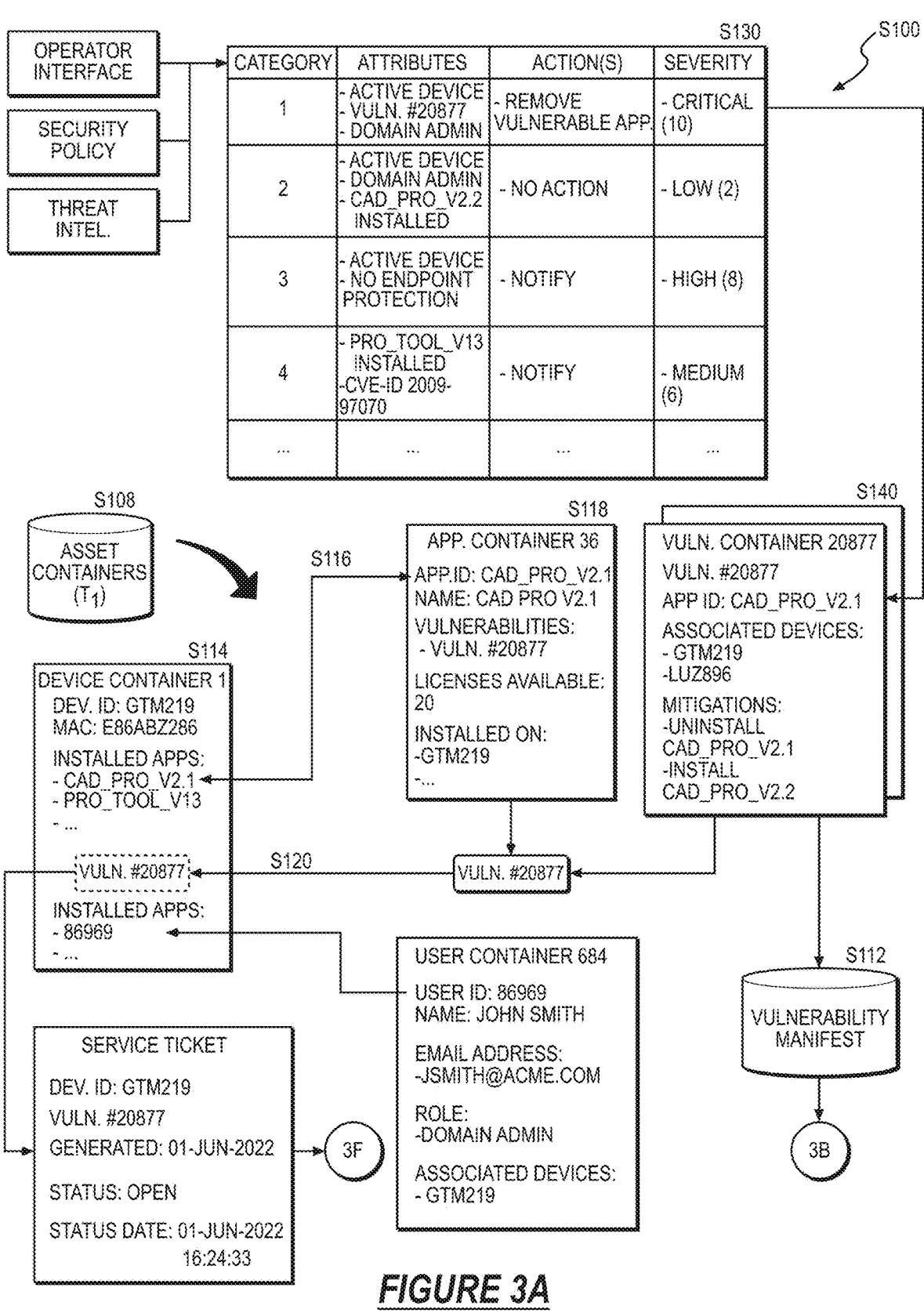

Generally—as shown in FIG. 3A—in Blocks S108, S114, and S116, the computer system can access (or generate), for a particular asset in a set of assets, an asset container specifying attributes representing the particular asset in relation to other assets, in the set of assets, during a target time interval. More specifically, the computer system can access the asset container further specifying attributes representing the particular asset (e.g., a device)—characterized by one asset class (e.g., the device asset class)—in relation to another asset (e.g., an application, a user) characterized by a different asset class (e.g., the software asset class, the user asset class). Then, the computer system can: identify (or generate) a set of associations (or "relationships") between the particular asset and other assets; and store this set of associations in the asset container and/or in another data structure (e.g., a relationship container for the particular asset, a database storing sets of associations for the set of assets).

In one implementation, in Block S114, the computer system can access a set of attributes, from an asset container in the set of asset containers, exhibited by a first asset (e.g., a first device) in a set of assets, the set of attributes including a subset of attributes related to a second asset (e.g., a first application, a first user)—characterized by a second asset class (e.g., the software asset class, the user asset class)—in the set of assets. In Block S116, based on the subset of attributes related to the second asset, the computer system can: identify an association between the first asset and the second asset; and store the association in the asset container.

In one example, the computer system accesses the first set of attributes—exhibited by a first device—including: a first subset of attributes related to assets characterized by the software asset class, such as a first attribute representing an application identifier of a first application installed on the first device; and a second subset of attributes related to assets characterized by the user asset class, such as a second attribute representing a username of a first user that logged in to the first device. In this example, the computer system: identifies a first association between the first device and the first application based on the first attribute; identifies a second association between the first device and the first user based on the second attribute; and stores the first association and the second association in a first asset container corresponding to the first device. The computer system can identify associations between the first device and other assets based on other attributes, such as attributes representing: applications installed and/or accessed on the first device; application activity on the first device; usernames that have logged in to the first device; user activity on the first device; etc.

In another example, the computer system accesses a second set of attributes—exhibited by a second application—including: a third subset of attributes related to assets characterized by the device asset class (e.g., devices on which the first application is installed and/or accessed, devices allocated a license to the first application); and a fourth subset of attributes related to assets characterized by the user asset class (e.g., usernames that have accessed the first application during a target time interval, email addresses allocated a license to the first application). In this example, the computer system: identifies a first set of associations between the second application and assets (e.g., devices on which the second application is installed or accessed, users accessing the second application), in the set of assets, based on the third subset of attributes and/or the fourth subset of attributes; and stores the first set of associations in a second asset container corresponding to the second application.

In another example, the computer system accesses a third set of attributes—exhibited by a third user—including: a fifth subset of attributes related to assets characterized by the device asset class (e.g., devices assigned to the third user, devices accessed by the third user); and a sixth subset of attributes related to assets characterized by the software asset class (e.g., applications accessed by the third user, application licenses allocated to the third user). In this example, the computer system: identifies a second set of associations between the third user and assets (e.g., devices accessed by and/or assigned to the third user, applications accessed by the third user), in the set of assets, based on the fifth subset of attributes and/or the sixth subset of attributes; and stores the second set of associations in a third asset container corresponding to the third user.

4.3 Asset Manifest

Generally, in Blocks S110 and S112, the computer system can fuse a set of asset containers-derived from isolated, internal objects published by disconnected sources-into one manifest identifying all unique assets, characterized by a particular asset class, connected to the computer network during the target time interval. Based on fixed identifying data and variable status data contained in asset containers in the set of asset containers, the computer system can: generate a manifest (or "aggregation") of assets affiliated with the computer network during the target time interval in Block S110; and label each asset in the manifest with a set of attributes exhibited by the asset during the target time interval based on a corresponding asset container in the set of asset containers in Block S112. For example, the computer system can label a first asset in the manifest with a first set of attributes exhibited by the first asset during the target time interval based on fixed identifying data and/or variable status data—attributed to the target time interval—contained in a first asset container representing the first asset.

In one implementation, the computer system can: generate a device manifest representing unique devices—characterized by the device asset class—connected to the computer network during a target time interval; and label each unique device in the device manifest with a set of attributes (or a subset of attributes) exhibited by the device during the target time interval.

In another implementation, the computer system can: generate a user manifest representing unique users—characterized by the user asset class—affiliated with the computer network during the target time interval; and label each unique user in the user manifest with a set of attributes (or a subset of attributes) exhibited by the user during the target time interval.

In yet another implementation, the computer system can: generate an application manifest representing unique applications—characterized by the software asset class—installed on devices connected to the computer network during the target time interval; and label each unique application in the application manifest with a set of attributes (or a subset of attributes) exhibited by the application during the target time interval.

4.3.1 Asset Manifest Update

The computer system can repeat the foregoing methods and techniques to update each manifest with assets—and their attributes—connected to the computer network over time, such as once per hour, twice per day, or daily.

5. Cross-Asset Data Model

In one implementation, in response to identifying an association between a first asset and a second asset based on a first set of attributes exhibited by the first asset during a target time interval, the computer system can: access a second set of attributes—exhibited by the second asset during the target time interval—from a second asset container corresponding to the second asset in Block S118; and associate the second set of attributes (or a subset of attributes in the second set of attributes) with the first asset in Block S120.

In one example, the computer system: identifies a first association between a first device and a first application; accesses a second set of attributes within a second container representing the first application; and associates the second set of attributes with the first device. More specifically, the computer system can: identify a first attribute, in a first set of attributes exhibited by the first device, representing the first application installed on the first device; identify a second attribute, in the second set of attributes, representing presence of a known vulnerability in the second application; and associate the second attribute—representing presence of the known vulnerability in the second application—with the first device.

Therefore, based on the first association between the first device and the first application, the computer system can detect that the first device exhibits the known vulnerability based on the first attribute and the second attribute.

Additionally, the computer system can aggregate the second attribute into (or link the second attribute to) the first set of attributes and/or a first asset container representing the first device.

In another example, the computer system: identifies a second association between a first user and the first application; accesses the first set of attributes within a first asset container representing the first device; and associates the first set of attributes with the first user. More specifically, the computer system can: identify a third attribute, in a third set of attributes exhibited by the first user, representing assignment of the first device to the first user; identify the second attribute—representing presence of the known vulnerability in the second application—associated with the first device; and associate the second attribute with the first user.

Therefore, based on the second association between the first user and the first device, the computer system can detect that the first user exhibits increased risk exposure based on the second attribute and the third attribute.

Accordingly, the computer system can: identify relationships between a particular asset and related assets characterized by different asset classes; and associate attributes—corresponding to these related assets—with the particular asset. Therefore, the computer system can characterize the particular asset with a more comprehensive and detailed set of attributes.

6. Vulnerability Identification

Generally, the computer system can implement similar methods and techniques to detect and distinguish individual vulnerabilities (e.g., software vulnerabilities, configuration vulnerabilities)—associated with the set of assets connected to the computer network—during discrete intervals, such as by: retrieving a set of objects (and/or registration logs, etc.) published by a set of vulnerability scanners (and/or security technologies, non-security technologies, etc.) designated for deployment on the computer network; identifying correspondence between objects (e.g., based on fixed identifying data and/or variable status data); and fusing this correspondence into a manifest (or "vulnerability manifest") containing one identifier for each vulnerability represented in at least one object in this set of objects.

The computer system can also label each vulnerability in the manifest with each vulnerability scanner—in the set of vulnerability scanners—that published at least one object corresponding to the vulnerability.

For example, the computer system can execute methods and techniques similar to those described in U.S. patent application Ser. No. 17/720,163 to: compile disparate logs published by various vulnerability scanners deployed on devices (e.g., physical devices, virtual devices) connected to the computer network into a first manifest (or "vulnerability manifest") for a vulnerability class; identify all unique vulnerabilities exhibited on devices connected to the computer network during a target time interval (e.g., a past hour); and label each unique vulnerability described in the first manifest with an exact combination of tracked vulnerability scanners executing on the device during the target time interval (e.g., based on the objects—published by these vulnerability scanners during the target time interval—that indicated the vulnerability).

6.1 Software Vulnerability Identification by Identifier

In one implementation, the computer system can scan a first target set of objects, published by a first vulnerability scanner, for unique vulnerability identifiers assigned to software vulnerabilities (or "application vulnerabilities") by the first vulnerability scanner, such as a security vulnerability (or "bug") associated with a software application. Then, for a first unique vulnerability identifier (e.g., a "Common Vulnerabilities and Exposures" identifier, an internal vulnerability identifier), the computer system can: isolate an object group, in the first target set of objects, containing this vulnerability identifier; extract fixed identifying data (e.g., application name, software vendor, version number, patch level, severity level) from this object group; and extract timeseries object-based identifying data from this object group.

For example, the computer system can extract and aggregate timeseries object-based identifying data from this object group to generate: a first timeseries of device hostnames; a second timeseries of device configurations; a third timeseries of MAC addresses; a fourth timeseries of IP addresses; a fifth timeseries of device configurations; a sixth timeseries of application configurations; a seventh timeseries of inbound data packets for the application, including size and source IP address; an eighth timeseries of outbound data packets from the application, including size and destination IP address; a ninth timeseries of port numbers; a tenth timeseries of software application activity; an eleventh timeseries of security policy configurations at an endpoint device; etc. Additionally or alternatively, the computer system can extract single-point values in these domains from the object group. The computer system can then compile these fixed and timeseries object-based data into one vulnerability container associated with the first unique vulnerability identifier.

The computer system can then repeat this process for each other unique vulnerability identifier represented in the first target set of objects published by the first vulnerability scanner in order to generate a first set of vulnerability containers associated with the first vulnerability scanner. Therefore, the computer system can consolidate the first target set of objects—published by the first vulnerability scanner during the target time interval—into one representation of fixed and timeseries object-based identifying data for each unique application vulnerability for which the first vulnerability scanner generates objects.

The computer system can then repeat this process for each other vulnerability scanner (and/or security technology, non-security technology, etc.) deployed on devices connected to the computer network to generate a set of vulnerability containers associated with each vulnerability scanner designated by the security protocol. Alternatively, the computer system can repeat this process for each other vulnerability scanner to further populate the first set of vulnerability containers associated with the first vulnerability scanner.

6.2 Vulnerability Containers

Generally, in Block S108, the computer system can implement similar methods and techniques to extract attributes (e.g., fixed identifying data, variable status data) from objects in an object group—published by different vulnerabilities scanners and identified by the computer system as corresponding to the same vulnerability—and compile these data into a composite container representing the vulnerability.

In one implementation, the computer system can generate a vulnerability container to include: a set of vulnerability attributes (e.g., a vulnerability name, a vulnerability identifier, a vulnerability description, a severity level); a set of actions (e.g., remediations, mitigations) for the vulnerability; a set of application attributes associated with an application corresponding to the vulnerability (e.g., an application name, a software vendor, a version number, a patch level); a quantity (or "count") of instances of presence of the vulnerability on endpoint devices in the computer network within a time interval (e.g., 30 days); a first representation (e.g., a list, a reference) of a set of endpoint devices on which the vulnerability is present within the time interval; a set of device attributes for each endpoint device in the set of devices (e.g.: a hostname; a MAC address; an IP address; an operating system; a location; a device type; a set of installed software on the endpoint device; a device configuration; an update history); a second representation of a set of users by which the application (or the set of devices) is accessed within the time interval; a set of user attributes associated with each user in the set of users (e.g., a name, a login username, a date of latest access, an activity time, an organization, a group, a role, a geolocation); and/or any other information associated with the vulnerability.

Additionally, the computer system can implement similar methods and techniques to: identify a set of associations between the vulnerability and a subset of assets (e.g., the application corresponding to the vulnerability, the set of endpoint devices on which the vulnerability is present within the time interval, the set of users by which the application (or the set of devices) is accessed within the time interval) in the set of assets; and store this set of associations in the vulnerability container and/or in another data structure (e.g., a relationship container for the vulnerability, a database storing sets of associations).

For example, the computer system can identify a first set of relationships between a first vulnerability and a first subset of assets based on: a first set of application attributes associated with a first application corresponding to the first vulnerability; a first representation (e.g., a list, a reference) of a set of endpoint devices on which the first vulnerability is present within a time interval; a set of device attributes for each endpoint device in the first set of devices; a second representation of a set of users by which the application (or the set of devices) is accessed within the time interval; and/or a set of user attributes associated with each user in the first set of users. The computer system can store the first set of relationships in a first vulnerability container for the first vulnerability and/or in another data structure.

In another implementation, the computer system can: access threat intelligence and/or other information associated with a vulnerability from a set of databases (e.g., governmental databases, commercial databases); and populate a corresponding vulnerability container with this information. More specifically, the computer system can: access threat intelligence defining attributes (e.g., a vulnerability name, a vulnerability identifier, a vulnerability description, a severity level, remediations and/or mitigations for the vulnerability, an application name and/or version number associated with the vulnerability) associated with the vulnerability; and store these attributes in a vulnerability container associated with the vulnerability.

In one example, the computer system: accesses a first record associated with a first vulnerability from a first governmental database in the set of databases; identifies a first vulnerability container—in a set of vulnerability containers—corresponding to the first vulnerability; extracts a first set of values (e.g., a first vulnerability name, a first vulnerability identifier, a first vulnerability description, a first severity value, a first set of actions for the second vulnerability) from the first record; and populates the first vulnerability container with the first set of values.

In another example, the computer system accesses a second record associated with a second vulnerability from the first governmental database. Then, in response to absence of a vulnerability container corresponding to the second vulnerability, the computer system: generates a second vulnerability container corresponding to the second vulnerability; extracts a second set of values (e.g., a second vulnerability name, a second vulnerability identifier, a second vulnerability description, a second severity value, a second set of actions for the second vulnerability) from the second record; and populates the second vulnerability container with the second set of values.

6.3 Software Vulnerability Identification by Association

In one implementation, the computer system can associate a first vulnerability container (and/or a first set of attributes within the first vulnerability container) with a second application container (and/or a second set of attributes within the second application container) based on a first association specifying a relationship between the first vulnerability and the second application.

For example, the computer system can: identify a first association between a first vulnerability and a second application; access a first vulnerability container representing the first vulnerability and storing a first set of attributes including a first attribute representing a first subset of devices on which the vulnerability is present (e.g., detected via vulnerability scanner); access a second application container representing the second application and storing a second set of attributes including a second attribute representing a second subset of devices on which the second application is installed; and associate the first set of attributes with the second set of attributes. More specifically, based on the relationship between the first vulnerability and the second application, and based on the second attribute representing the second subset of devices on which the second application is installed, the computer system can: detect that the vulnerability is present on the second subset of devices; and identify additional associations between the first vulnerability and the second subset of devices. In this example, the computer system can update the first vulnerability container to specify the first attribute representing the first subset of devices and the second subset of devices. Additionally or alternatively, the computer system can update the first vulnerability container and/or device containers—corresponding to the second subset of devices—to specify these additional associations.

In this example, the computer system can also: access the first vulnerability container storing the first set of attributes including a third attribute representing a first identifier of the second application; access a first device container representing a first device in the first subset of endpoint devices and storing a third set of attributes including a fourth attribute representing a third subset of applications, including the second application, installed on the first device; and identify the first device as associated with the first vulnerability based on the third attribute—representing the first identifier of the second application-represented in the third set of attributes (e.g., the fourth attribute representing the second application installed on the first device) characterizing the first device.

Accordingly, the computer system can: identify relationships between a vulnerability and a set of related assets of different asset classes (e.g., devices, software applications, users); and associate attributes—corresponding to these related assets—with the vulnerability. Therefore, the computer system can detect presence of the vulnerability on a particular endpoint device absent direct reporting (e.g., a published object or log) of the vulnerability on the particular endpoint device by a vulnerability scanner or other technology.

6.4 Environmental Vulnerabilities

Block S130 of the method S100 recites accessing a first combination of attributes defining a first vulnerability in a first set of vulnerabilities.

Generally, in Blocks S130, S140, and S108, the computer system can: identify an environmental vulnerability (e.g., a security vulnerability, an operational vulnerability) associated with a subset of assets (e.g., devices, applications, users); and generate a vulnerability container representing the environmental vulnerability.

More specifically, the computer system can define a combination of attributes—characterizing the environmental vulnerability—including: a first subcombination of attributes associated with assets (e.g., devices) characterized by a first asset class (e.g., a device asset class); a second subcombination of attributes associated with assets (e.g., users) characterized by a second asset class (e.g., a user asset class); and/or a third subcombination of attributes associated with assets (e.g., applications) characterized by a second asset class (e.g., a software asset class). The computer system can store the combination of attributes in the vulnerability container.

In one implementation, in Block S130, the computer system accesses a target combination of attributes characterizing a configuration vulnerability.

In one example, the computer system: receives a first combination of attributes and a first severity score as input from the operator via the operator interface; defines the first combination of attributes characterizing a first environmental vulnerability based on the input; assigns the first severity score to the first environmental vulnerability; and stores the first combination of attributes and the first severity score in a first vulnerability container associated with the first environmental vulnerability.

In another example, the computer system: accesses a policy (threat intelligence, or other information) defining the first combination of attributes characterizing the first environmental vulnerability and the first severity score; and stores the first combination of attributes and the first severity score in the first vulnerability container associated with the first environmental vulnerability.

6.4.1 Environmental Vulnerability Identifier

In one implementation, the computer system can implement the foregoing methods and techniques: to scan a target set of objects—published by a set of vulnerability scanners and/or other technologies—for a unique vulnerability identifier assigned to an environmental vulnerability; to isolate an object group containing this vulnerability identifier; to extract fixed identifying data and timeseries object-based identifying data from this object group; and to compile these data into a vulnerability container associated with the environmental vulnerability.

For example, the computer system can: identify a first environmental vulnerability representing absence of a resource monitoring solution on a business critical application server; scan a set of objects—published by the set of vulnerability scanners—for a first vulnerability identifier assigned to the first environmental vulnerability; isolate a first object group containing the first vulnerability identifier; extract fixed identifying data and timeseries object-based identifying data from the first object group; and store these data into a first vulnerability container associated with the first environmental vulnerability.

In this example, the computer system can generate the first vulnerability container including: a set of vulnerability attributes associated with the first environmental vulnerability; a set of actions for the first environmental vulnerability; a set of application attributes associated with the resource monitoring solution; a count of instances of presence of the first environmental vulnerability on devices in the computer network; a first representation of a set of devices (e.g., critical application servers) on which the first environmental vulnerability is present; a set of device attributes for each device in the set of devices; a set of associations between the first environmental vulnerability and a subset of assets; etc.

6.4.2 Environmental Vulnerability Identification by Attributes

Block S140 of the method S100 recites identifying a first subset of assets, in the first set of assets and including the first asset, associated with the first vulnerability based on the first combination of attributes represented in the first set of attributes.

Generally, in Blocks S130, S140, and S108, the computer system can: access a target combination of attributes defining an environmental vulnerability; identify a subset of asset containers in the set of asset containers specifying combinations of attributes corresponding to the target combination of attributes; and identify a subset of assets—in the set of assets and corresponding to the subset of asset containers— associated with the environmental vulnerability. The computer system can generate a vulnerability container associated with the configuration vulnerability and specifying a set of attributes associated with the subset of assets.

For example, the computer system can access a first target combination of attributes representing a first environmental vulnerability (e.g., absence of a resource monitoring solution on a business-critical application server). In this example, the computer system can access the first target combination of attributes including: a first attribute representing an application server; a second attribute representing business criticality; and a third attribute representing a null set (or null value) associated with resource monitoring solutions installed on a device. The computer system can: scan a set of asset containers; identify a subset of device containers specifying combinations of attributes corresponding to the target combination of attributes; and identify a subset of devices—corresponding to the subset of device containers—associated with the first environmental vulnerability. The computer system can generate a first vulnerability container corresponding to the first configuration vulnerability, the first vulnerability container specifying a fourth attribute representing a subset of devices represented by the subset of device containers and exhibiting the first configuration vulnerability.

In one implementation, the computer system: accesses a first combination of attributes defining a first environmental vulnerability in Block S130; accesses a first asset container associated with a first asset (e.g., a first device, a first user) in a set of assets in Block S114, the first asset container storing a first set of attributes characterizing the first asset during a first time interval; and identifies the first asset as associated with the first environmental vulnerability based on the first combination of attributes represented in the first set of attributes in Block S140.

The computer system repeats the foregoing methods and techniques: to access an asset container—associated with an asset in the set of assets—storing a set of attributes characterizing the asset during the first time interval; and identify the asset, in a subset of assets, as associated with the first environmental vulnerability based on the first combination of attributes represented in the set of attributes.

The computer system repeats the foregoing methods and techniques for each vulnerability in a set of vulnerabilities: to access a combination of attributes defining the vulnerability; to access a set of asset containers storing sets of attributes characterizing the set of assets during the first time interval; and to identify a subset of assets, in the set of assets, associated with the vulnerability based on the combination of attributes represented in the sets of attributes.

For example, the computer system can: access a second combination of attributes defining a second environmental vulnerability; access the first asset container—associated with the first asset—storing the first set of attributes characterizing the first asset during the first time interval; and identify the first asset as associated with the second environmental vulnerability based on the second combination of attributes represented in the first set of attributes.

In another implementation, in Block S130, the computer system accesses a first combination of attributes—characterizing a first environmental vulnerability—including: a first subcombination of attributes associated with assets characterized by a first asset class (e.g., the device asset class); and a second subcombination of attributes associated with assets characterized by a second asset class (e.g., the user asset class).

In this implementation, the computer system: accesses a first asset container (e.g., a first device container) storing a first set of attributes exhibited by a first asset (e.g., a first device characterized by the device asset class) during a first time interval in Block S114; accesses a second asset container (e.g., a first user container) storing a second set of attributes exhibited by a second asset (e.g., a first application characterized by the software asset class) during the first time interval in Block S118; and identifies a first subset of attributes—in the second set of attributes exhibited by the second asset—associated with the first asset based on a first association between the first asset and the second asset (e.g., the first device includes the first application installed thereon) in Block S120.

In Block S140, the computer system identifies the first asset as associated with the first environmental vulnerability based on the first combination of attributes represented in the first set of attributes and the second set of attributes. More specifically, the computer system can identify the first asset as associated with the first vulnerability based on: the first subcombination of attributes represented in a second subset of attributes in the first set of attributes characterizing the first asset; and the second subcombination of attributes represented in a third subset of attributes in the first subset of attributes associated with the first asset (and in the second set of attributes characterizing the second asset).

Accordingly, the computer system can identify a subset of assets (or an "asset group")—including the first asset—exhibiting the first combination of attributes during the first time interval based on the first combination of attributes represented in: the first set of attributes; and the first subset of attributes associated with the first asset.

Therefore, the computer system can identify a particular asset—characterized by a particular asset class—as belonging to an asset group exhibiting a target combination of attributes based on: a set of attributes exhibited by the particular asset during a target time interval; and attributes associated with the particular asset based on relationships between the particular asset and other assets characterized by different asset classes.

6.4.3 Queries

Figure 4:
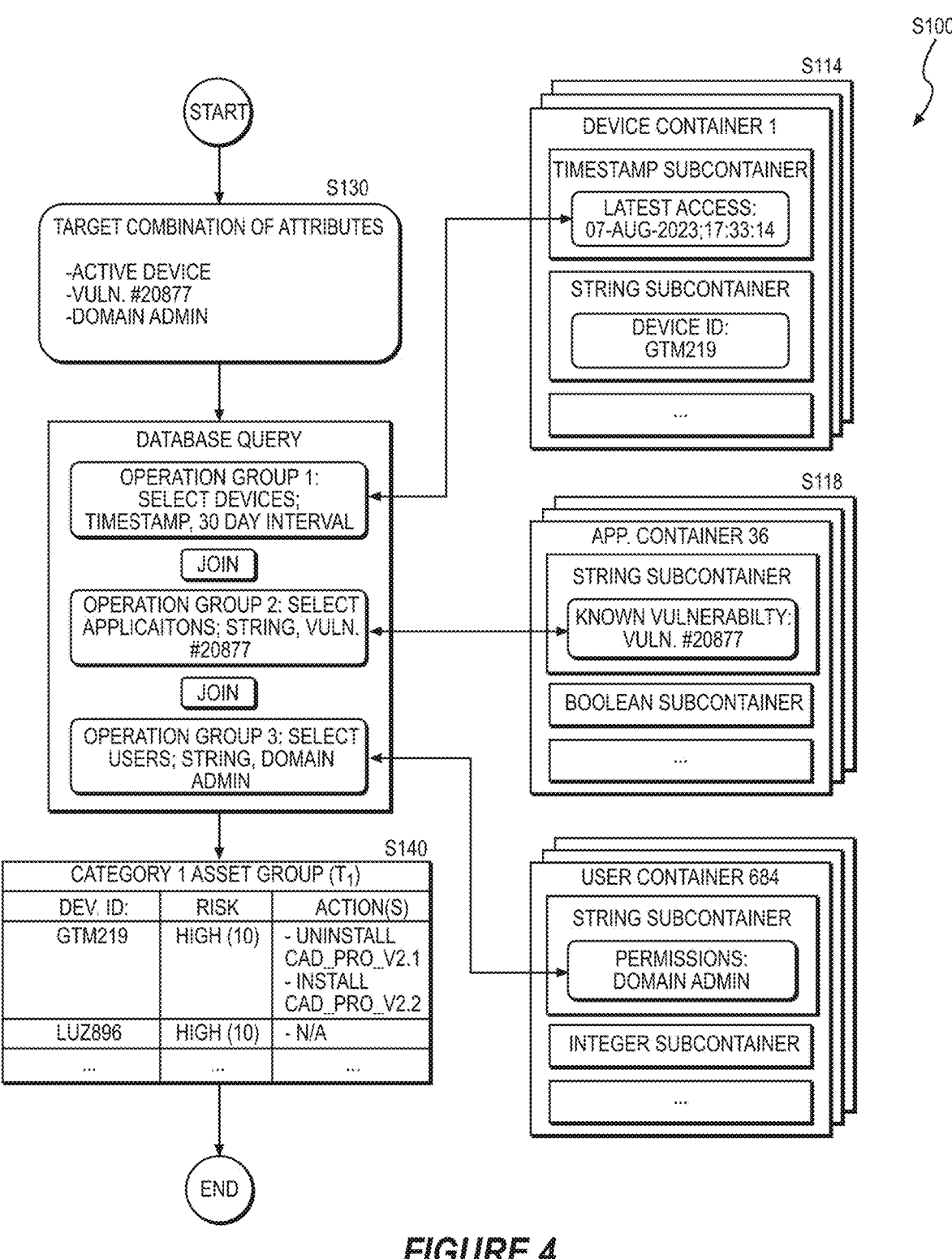
FIG. 4 is a flowchart representation of one variation of the method.

Generally, as shown in FIG. 4, the computer system can: access a target combination of attributes; generate a database query including a set of operations representing the target combination of attributes; and execute the database query on the set of asset containers and/or the manifest(s). The computer system can identify a subset of assets (or an "asset group")—exhibiting the target combination of attributes—in response to executing the database query.

In one implementation, the computer system accesses a target combination of attributes—defining a vulnerability—including: a first subcombination of attributes associated with assets characterized by the device asset class; a second subcombination of attributes associated with assets characterized by the software asset class; and/or a third subcombination of attributes associated with assets characterized by the user asset class.

The computer system generates a database query including a set of operations representing the target combination of attributes. More specifically, the computer system can generate a database query including: a first operation (or a first subset of operations) representing the first subcombination of attributes; a second operation (or a second subset of operations) representing the second subcombination of attributes; and a third operation (or a third subset of operations) representing the second subcombination of attributes.

For example, the computer system can generate the database query including a first operation representing a first attribute, in the target combination of attributes, exhibiting the string data type. In this example, the computer system can execute the database query—including the first operation—on a first subcontainer (e.g., a first table) in a first asset container corresponding to a first asset, the first subcontainer storing attributes, corresponding to the first asset, exhibiting the string data type. The computer system can execute the database query including other operations (e.g., the second operation, the third operation) in the set of operations to identify an asset group exhibiting the target combination of attributes during the target time interval.

In this implementation, in response to executing this database query, the computer system can: identify a first subset of devices (e.g., in the device manifest) exhibiting the first subcombination of attributes during the target time interval, such as the first asset; identify a second subset of applications (e.g., in the application manifest) exhibiting the second subcombination of attributes during the target time interval, such as a second asset; and identify a third subset of users (e.g., in the user manifest) exhibiting the third subcombination of attributes during the target time interval. More specifically, the computer system can: identify the second subset of applications further exhibiting an association with devices in the first subset of devices; and identify the third subset of users further exhibiting an association with devices in the first subset of devices.

In response to executing the database query, the computer system can identify an asset group including the first subset of devices—associated with the first vulnerability—based on the second subset of applications and the third subset of users. More specifically, the computer system can identify the asset group including the first subset of devices exhibiting associations with the applications in the second subset of applications and/or associations with users in the third subset of users, such as a first association between the first asset and the second asset. Additionally or alternatively, the computer system can identify the asset group including the first subset of devices based on associations between applications in the second subset of applications and users in the third subset of users.

The computer system can execute similar methods and techniques to identify an asset group including the third subset of users—associated with the first vulnerability—based on the second subset of applications and the first subset of devices in response to executing a database query.

6.4 Vulnerability Coalescence & Manifest

Generally, the computer system can implement methods and techniques similar to those described in U.S. patent application Ser. No. 17/720,163 to generate a manifest (or "aggregation") of vulnerabilities exhibited by assets connected to the computer network during the target time interval based on fixed identifying data and variable status data contained in a set of vulnerability containers.

For example, the computer system can: calculate similarities between vulnerability containers; and identify groups of vulnerability containers that correspond to the same vulnerability based on fixed and timeseries object-based features stored in these vulnerability containers. In this example, the computer system can: calculate a similarity score between a first vulnerability descriptor in a first vulnerability container and a second vulnerability description in a second vulnerability container exceeding threshold similarity score; detect the first vulnerability container and the second vulnerability container corresponding to the same vulnerability; and coalesce (or unify) the first vulnerability container and the second vulnerability container into a single vulnerability container representing the vulnerability. The computer system can generate the vulnerability manifest specifying: a set of vulnerabilities (e.g., all unique vulnerabilities) exhibited in the computer network based on the set of vulnerability containers; a subset of attributes (or other information) associated with each vulnerability in the set of vulnerabilities; and/or a set of actions (e.g., remediations, mitigations) associated with each vulnerability in the set of vulnerabilities. Additionally or alternatively, the computer system can generate the vulnerability manifest specifying a subset of vulnerabilities exhibited by a single asset (e.g., device) in the computer network. The computer system can serve a visualization depicting the manifest at an operator portal.

Accordingly, the computer system can consolidate (or "de-duplicate") data—published by different sources—into one representation for each unique vulnerability in a set of vulnerabilities exhibited by a set of assets in a computer network, thereby enabling the computer system to accurately characterize: a scope of these vulnerabilities in the computer network; and a magnitude of risk to the computer network based on these vulnerabilities.

7. Risk Scores

Blocks of the method S100 recite: calculating a first quantity of assets in the first subset of assets associated with the first vulnerability in Block S142; and calculating a first vulnerability risk score, in a first set of vulnerability risk scores associated with the first set of vulnerabilities, associated with the first vulnerability based on the first quantity of assets and a first severity score assigned to the first vulnerability in Block S144.

Generally, the computer system can characterize a risk level for a vulnerability and/or for assets associated with the vulnerability.

In one implementation, the computer system accesses a first severity score assigned to a first vulnerability in a set of vulnerabilities. In response to identifying a first subset of assets (e.g., devices, users, applications) associated with the first vulnerability, the computer system: calculates a first quantity of assets in the first subset of assets in Block S142; and calculates a first vulnerability risk score associated with the first vulnerability based on the first quantity of assets and the first severity score in Block S144.

In one example, the computer system: accesses a first severity score of "10" (or "critical" severity) assigned to a first vulnerability; identifies a first subset of devices associated with the first vulnerability; calculates a first quantity of devices (e.g., 700 devices) in the first subset of devices; and calculates a first vulnerability risk score of 7,000 for the first vulnerability based on the first quantity of devices and the first severity score (e.g., based on a product of the first quantity of devices and the first severity score).

The computer system can repeat the foregoing methods and techniques for each vulnerability in the set of vulnerabilities: to identify a subset of assets associated with the vulnerability; to access a severity score assigned to the vulnerability; to calculate a quantity of assets in the subset of assets; and to calculate a vulnerability risk score, in a set of vulnerability risk scores, for the vulnerability based on the quantity of assets and the severity score.

7.1 Vulnerability Risk Score Based on Asset Criticality

In one variation, the computer system calculates a vulnerability risk score for a vulnerability based on: a severity level assigned to the vulnerability; a quantity of assets associated with the vulnerability; attributes characterizing these assets associated with the vulnerability; and a set of rules associated with these attributes.

For example, the computer system can access a first rule defining a first set of weights associated with a (user) role attribute, the first set of weights including: a first weight (e.g., highest criticality, "1.5") associated with an "executive" role; a second weight (e.g., high criticality, "1.2") associated with an "administrator" role; a third weight (e.g., medium criticality, "1") associated with an "employee" role; and a fourth weight (e.g., low criticality, "0.5") associated with an "intern" role.

In this example, in response to identifying a first subset of devices—including a first device and a second device—associated with a first vulnerability, the computer system can: access a first device container storing a first set of attributes characterizing the first device during a first time interval and including a first attribute identifying a first user associated with the first device; access a first user container storing a second set of attributes characterizing the first user during the first time interval and including a second attribute defining a first role (e.g., the "administrator" role) assigned to the first user; and access the first weight assigned to the first role (i.e., the "administrator" role).

The computer system can: access a second device container storing a third set of attributes characterizing the second device during the first time interval and including a third attribute identifying a second user associated with the second device; access a second user container storing a fourth set of attributes characterizing the second user during the first time interval and including a fourth attribute defining a second role (e.g., the "employee" role) assigned to the second user; and access the third weight assigned to the second role (i.e., the "employee" role).

In this example, the computer system can: access a first severity score assigned to the first vulnerability; calculate a first quantity of devices (e.g., two devices) in the first subset of devices; and calculate a first vulnerability risk score based on the first quantity of devices, the first severity score assigned to the first vulnerability, the first weight assigned to the first role, and the second weight assigned to the second role.

More specifically, the computer system can: calculate a second quantity of devices in the first quantity of devices and associated with users assigned the first role; calculate a third quantity of devices in the first quantity of devices and associated with users assigned the second role; calculate a first product of the second quantity of devices and the first weight; calculate a second product of the third quantity of devices and the second weight; and calculate the first vulnerability risk score based on (e.g., a sum of) the first product and the second product.

Therefore, by calculating vulnerability risk scores based on variable weights according to user role (or other attributes indicating criticality of an asset), the computer system can more accurately and comprehensively characterize risk of a particular vulnerability impacting critical assets in order to enable an operator to prioritize remediation or mitigation of the particular vulnerability.

7.2 Asset Risk Score

In another implementation, the computer system can: access a device container corresponding to a device, the device container specifying a set of associations representing relationships between the device and a set of vulnerabilities; identify a set of vulnerabilities exhibited on the device based on the set of associations; access a set of vulnerability containers corresponding to the set of vulnerabilities; identify a set of severity values (e.g., severity levels, severity scores) corresponding to the set of vulnerabilities and specified in the set of vulnerability containers; and calculate an asset risk score (e.g., a device risk score) for the device based on the set of vulnerabilities and the set of severity levels. The computer system can store the asset risk score in the asset container.

In one example, the computer system: identifies a first set of vulnerabilities exhibited on a first device based on a first set of associations specified in a first device container corresponding to the first device, the first set of vulnerabilities including a first vulnerability and a second vulnerability; identifies a first severity value (e.g., "critical" severity, severity score of "10") for the first vulnerability based on a first vulnerability container corresponding to the first vulnerability; and identifies a second severity value (e.g., "low" severity, severity score of "2") for the second vulnerability based on a second vulnerability container corresponding to the second vulnerability. In this example, the computer system calculates a first asset risk score (e.g., "12") based on the first set of vulnerabilities, the first severity value, and the second severity value. Additionally or alternatively, the computer system characterizes a level of risk (e.g., high risk) associated with the first device based on the asset risk score falling within a risk score range (e.g., 10-15) corresponding to the level of risk. The computer system stores the first asset risk score and/or the level of risk in the first device container.

In another example, the computer system: identifies a second set of vulnerabilities exhibited on a second device based on a second set of associations specified in a second device container corresponding to the second device, the second set of vulnerabilities including a third vulnerability; identifies a third severity value (e.g., "medium" severity, severity score of "5") for the third vulnerability based on a third vulnerability container corresponding to the third vulnerability. In this example, the computer system: calculates a second asset risk score (e.g., "5") based on the second set of vulnerabilities and the third severity value; and stores the second asset risk score and/or a level of risk in the second device container.

7.2.1 Asset Risk Score Based on Asset Criticality

In another variation, the computer system can calculate an asset risk score for the device based on the set of vulnerabilities, the set of severity levels, a set of attributes corresponding to the device, and a set of rules associated with the set of attributes.

In one example, the computer system accesses a first rule defining a set of weights associated with a user role attribute. In this example, the computer system: accesses a first device container of a first device, the first device container specifying a first attribute identifying a first user associated with the first device; accesses a first user container of the first user, the first user container specifying a second attribute identifying the first user as exhibiting an intern role; and identifies a first weight (e.g., low criticality, "0.5") in the set of weights associated with an "intern" role based on the first rule. The computer system: identifies a first set of vulnerabilities exhibited on the first device based on a first set of associations specified in the first device container, the first set of vulnerabilities including a first vulnerability and a second vulnerability; identifies a first severity value (e.g., "critical" severity, severity score of "10") for the first vulnerability based on a first vulnerability container corresponding to the first vulnerability; and identifies a second severity value (e.g., "low" severity, severity score of "2") for the second vulnerability based on a second vulnerability container corresponding to the second vulnerability. In this example, the computer system: calculates a first asset risk score (e.g., "6") based on the first set of vulnerabilities, the first severity value, the second severity value, and the first weight; and stores the first asset risk score in the first device container.

In another example, the computer system: accesses a second device container of a second device, the second device container specifying a third attribute identifying a second user associated with the second device; accesses a second user container of the second user, the fourth user container specifying a fourth attribute identifying the second user as exhibiting an executive role; and identifies a second weight (e.g., high criticality, "1.5") in the set of weights associated with an "executive" role based on the first rule. The computer system then: identifies a second set of vulnerabilities exhibited on the second device based on a second set of associations specified in the second device container, the second set of vulnerabilities including a third vulnerability; and identifies a third severity value (e.g., "medium" severity, severity score of "5") for the third vulnerability based on a third vulnerability container corresponding to the third vulnerability. In this example, the computer system: calculates a second asset risk score (e.g., "7.5") based on the second set of vulnerabilities, the third severity value, and the second weight; and stores the second asset risk score in the second device container.

Accordingly, the computer system can characterize the first endpoint device: as exhibiting a "critical" vulnerability and a "low" vulnerability; and as associated with the first user in the intern role. By calculating asset risk scores based on variable weights according to user role, the computer system can also characterize the second endpoint device: as exhibiting a "medium" vulnerability and associated with the second user in the executive role; and as exhibiting the second asset risk score exceeding the first asset risk score of the first device. Therefore, the computer system can accurately and comprehensively characterize an overall risk of a device based on: severity of vulnerabilities exhibited on the device; and an impact of these vulnerabilities to the overall risk according to context of the device as represented by attributes associated with the device.

Additionally or alternatively, the computer system can calculate an asset risk score according to other rules defining weights associated with other attributes or factors.

7.3 Organization Risk Score

In one implementation, the computer system can calculate a composite risk score for the computer system based on a set of asset risk scores for a set of assets in the computer network. In one example, for a computer network including a first device exhibiting a first asset risk score of "6" and a second device exhibiting a second asset risk score of "7.5," the computer system calculates a composite risk score of "13.5" based on a sum of the first asset risk score and the second asset risk score.

In another implementation, the computer system can generate a vulnerability manifest further specifying: an asset risk score for each vulnerability in the vulnerability manifest; and the composite risk score representing a total level of risk of an organization. The computer system can serve a visualization of the vulnerability manifest at an operator portal.

8. Visualization

Blocks of the method S100 recite: selecting a first subset of vulnerabilities, in the first set of vulnerabilities, exhibiting highest vulnerability risk score in the first set of vulnerability risk scores in Block S146; generating a first visualization indicating the first subset of vulnerabilities including the first vulnerability and the first quantity of assets associated with the first vulnerability in Block S150; and serving the first visualization to an operator via an operator interface in Block S152.

Generally, in Blocks S150 and S152, the computer system can: generate a visualization indicating the set of vulnerabilities (or a subset of vulnerabilities); and serve the visualization to an operator via the operator interface.

In one implementation, in response to calculating a set of vulnerability risk scores associated with a set of vulnerabilities during a target time interval, the computer system selects a subset of vulnerabilities, in the set of vulnerabilities, exhibiting highest vulnerability risk score in the set of vulnerability risk scores in Block S146.

For example, in response to calculating the set of vulnerability risk scores associated with the set of vulnerabilities, the computer system can: sort the set of vulnerabilities according to vulnerability risk score (e.g., from highest vulnerability risk score to lowest vulnerability risk score) as an ordered set of vulnerabilities; and select a subset of vulnerabilities (e.g., ten vulnerabilities)—in the ordered set of vulnerabilities—exhibiting highest vulnerability risk score.

In another implementation, the computer system: generates a visualization indicating the subset of vulnerabilities in Block S150; and serves the visualization to the operator via the operator interface in Block S152.

Therefore, by generating the visualization indicating the subset of vulnerabilities exhibiting highest vulnerability risk scores, the computer system enables the operator to prioritize remediation or mitigation of these vulnerabilities that pose greatest overall risk to the computer network.

Additionally, for each vulnerability in the subset of vulnerabilities, the computer system can generate the visualization indicating: an identifier of the vulnerability; a quantity of assets associated with the vulnerability; a representation (e.g., a list, a reference) of the subset of assets associated with the vulnerability; etc.

For example, for a first vulnerability in the subset of vulnerabilities, the computer system can: generate a first list of a first subset of devices associated with the first vulnerability; access a first set of asset risk scores assigned to the first subset of devices; order the first list of the first subset of devices—as a first ordered list of devices—based on the first set of asset risk scores (e.g., from highest asset risk score to lowest asset risk score); and generate the visualization indicating the first ordered list of devices associated with the first vulnerability.

Figure 3C:
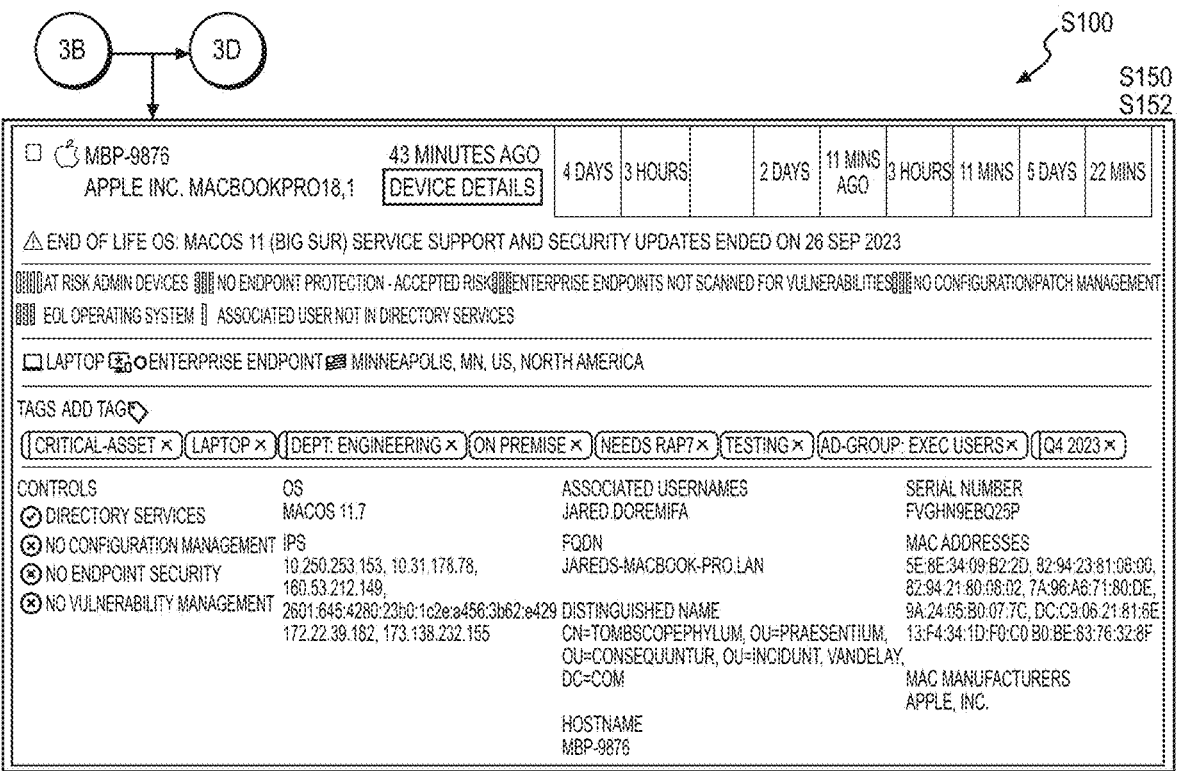

In another implementation, as shown in FIG. 3C, for each device in the first subset of devices, the computer system can generate the visualization indicating: a combination of vulnerabilities associated with the device; a severity score of each vulnerability in the combination of vulnerabilities; and/or other device attributes (e.g., a device name, an operating system, a MAC address, an IP address, a group(s), a tag(s)) associated with the device.

Therefore, by ordering a list of assets associated with a vulnerability according to asset risk score, the computer system enables the operator to prioritize remediation or mitigation of vulnerabilities on assets that exhibit greatest overall risk to the computer network.

8.1 Vulnerability Status

Generally, for each asset in a subset of assets associated with a vulnerability, the computer system can assign the asset a status relative to the vulnerability.

In one implementation, in response to identifying a first asset as associated with a first vulnerability during a first time interval, the computer system scans an electronic service ticket database for an electronic service ticket associated with the first asset and the first vulnerability.

In response to identifying a first electronic service ticket—in the electronic service ticket database—associated with the first asset and the first vulnerability, the computer system: accesses the first electronic service ticket indicating a first status (e.g., an "open" status awaiting execution of an action, an "in progress" status responsive to initiation of the action, a "resolved" status responsive to execution of the action); and assigns the first status to the first asset relative to the first vulnerability.

For example, the computer system can access the first electronic service ticket indicating the first status corresponding to: an "open" status awaiting execution of an action; an "in progress" status responsive to initiation of the action; a "resolved" status responsive to execution of the action; a "snooze" status representing acceptance of the first vulnerability for a predefined time period; a "risk accepted" status representing acceptance of the first vulnerability.

Alternatively, in response to absence of an electronic service ticket—associated with the first asset and the first vulnerability—in the electronic service ticket database, the computer system: generates a first electronic service ticket associated with the first asset and the first vulnerability; and stores the first electronic service ticket in the electronic service ticket repository.

For example, the computer system can generate the first electronic service ticket indicating: a first status (e.g., the "open" status); a first timestamp representing a date and/or time at which the first electronic service ticket is generated; a most recent time interval (e.g., the first time interval) during which the first device is associated with the first vulnerability; etc.

In response to identifying (or assigning) the first status of the first asset relative to the first vulnerability, the computer system: generates the visualization indicating the first status of the first asset relative to the first vulnerability; and serves the visualization to the operator via the operator interface.

The computer system repeats the foregoing methods and techniques for each asset in a subset of assets associated with the first vulnerability during the first time interval: to identify (or assign) a status of the asset relative to the first vulnerability; to generate the visualization indicating the status of the asset relative to the first vulnerability; and to serve the visualization to the operator via the operator interface.

Additionally or alternatively, the computer system can: calculate a quantity of assets exhibiting a target status (e.g., the "open" status, the "in progress" status, the "snooze" status) relative to the first vulnerability; generate the visualization indicating the quantity of assets exhibiting the target status relative to the first vulnerability; and serve the visualization to the operator via the operator interface.

The computer system repeats the foregoing methods and techniques for each vulnerability in a set of vulnerabilities detected during the first time interval.

8.1.1 Status Change

Generally, the computer system can assign an action (or a set of actions) to a vulnerability. The computer system can interface with the operator via the operator portal to directly assign actions to vulnerabilities. Additionally or alternatively, the computer system can assign an action to a vulnerability based on threat intelligence (or other information) associated with the vulnerability.

In one implementation, in response to identifying a first subset of assets—including a first asset—associated with a first vulnerability, the computer system: accesses a first action assigned to the first vulnerability; and executes the first action—such as device quarantine, removal of an application, restriction of user permissions, notification to an operator, etc.—on the first asset. In response to executing the first action on the first asset, the computer system assigns a second status to the first asset relative to the first vulnerability.

In one example, in response to identifying the first device associated with the first vulnerability (e.g., a software vulnerability affecting a first application installed on the first device), the computer system: executes the first action including removing (e.g., uninstalling, deleting) the first application from the first device; and assigns a second status—corresponding to the "resolved" status—to the first device relative to the first vulnerability.

In another example, in response to identifying the first device associated with a second vulnerability (e.g., absence of endpoint protection on the first device), the computer system: executes the first action including installing from the first device; and assigns a second status—corresponding to the "in progress" status—to the first device relative to the first vulnerability. In this example, the computer system assigns the second status corresponding to the "in progress" status: in response to initiating installation of endpoint protection on the first device; and awaiting completion of the installation (e.g., reboot of the first device).

In another implementation, in response to assigning the second status to the second asset, the computer system: generates a second visualization indicating the second status of the first asset relative to the first vulnerability; and serves the second visualization to the operator via the operator interface.

Additionally, in response to assigning the second status to the first asset relative to the first vulnerability, the computer system can: access a first electronic service ticket—associated with the first asset and the first vulnerability—from the electronic service ticket database; and update the first electronic service ticket indicating the second status of the first asset relative to the first vulnerability.

The computer system repeats the foregoing methods and techniques for each asset in the first subset of assets, and for each vulnerability in the set of vulnerabilities.

8.1.2 Vulnerability Age

In another implementation, for each asset in the first subset of assets, the computer system: identifies a status of the asset relative to a vulnerability for a target time interval; in response to the status corresponding to a target status (e.g., an "open" status, a status other than a "resolved" status) calculates a duration for which an asset exhibits the target status relative to the vulnerability; and identifies (e.g., flags) the asset as violating policy (e.g., a service level agreement) associated with the vulnerability in response to the duration exceeding a predefined threshold duration (e.g., defined by the service level agreement).

For example, the computer system can: access a first policy for the first vulnerability and defining a first predefined threshold duration (e.g., twelve days); and access a first electronic service ticket associated with the first asset and the first vulnerability. The first electronic service ticket indicates: a first status (e.g., an "open" status) of the first asset relative to the first vulnerability; and a first timestamp representing a date and/or time at which the first electronic service ticket is generated.

In this example, in response to the first status corresponding to the target status (e.g., the "open" status), the computer system: calculates a first duration (e.g., fourteen days) for which the first asset exhibits the target status relative to the first vulnerability; and flags the asset as violating policy associated with the first vulnerability in response to the first duration exceeding the first predefined threshold duration.

The computer system repeats the foregoing methods and techniques for each asset in the first subset of assets and for each vulnerability in the subset of vulnerabilities.

In another implementation, for each vulnerability in the subset of vulnerabilities, the computer system: accesses a quantity of assets associated with the vulnerability for a target time interval; calculates a proportion (e.g., a percentage) of assets, in the quantity of assets, identified as violating policy associated with the vulnerability; and generates the visualization indicating the proportion of assets identified as violating policy associated with the vulnerability.

8.2 Related Vulnerabilities

Figure 3D:
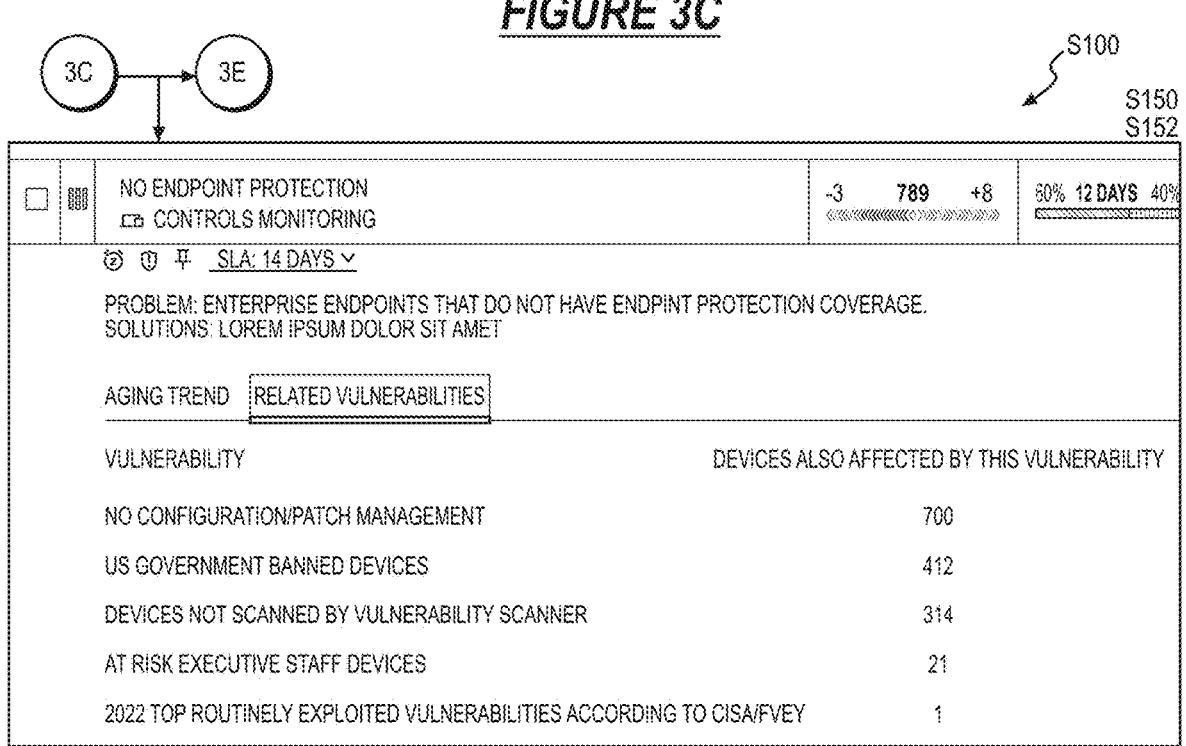

In one implementation, as shown in FIG. 3D, in response to identifying a first subset of assets associated with a first vulnerability in the set of vulnerabilities, the computer system identifies a subset of vulnerabilities—in the set of vulnerabilities—associated with (or related to) assets in the first subset of assets. For each vulnerability in the subset of vulnerabilities, the computer system: identifies a second subset of assets—in the first subset of assets—associated with the vulnerability; calculate a quantity of assets in the second subset of assets; and generates the visualization indicating the vulnerability and the quantity of assets associated with the vulnerability.

For example, in response to identifying a first subset of devices associated with a first vulnerability in the set of vulnerabilities, the computer system can execute the foregoing methods and techniques to identify a first group of vulnerabilities—in the set of vulnerabilities—associated with a first device in the first subset of devices for the first time interval. The computer system can repeat the foregoing methods and techniques for each device in the first subset of devices to identify a group of vulnerabilities—in the set of vulnerabilities—associated with the device for the first time interval.

In this example, the computer system can calculate a first quantity of devices (e.g., 700 devices), in the first subset of devices, associated with a second vulnerability (e.g., "No configuration/patch management") in the set of vulnerabilities. The computer system can repeat the foregoing methods and techniques for each vulnerability in the set of vulnerabilities to calculate a quantity of devices—in the first subset of devices—associated with the vulnerability for the first time interval.

The computer system can: order the set of vulnerabilities, as an ordered set of vulnerabilities, according to quantities of devices associated with the set of vulnerabilities (e.g., from greatest quantity of devices to fewest quantity of devices); and identify a first subset of vulnerabilities (e.g., five vulnerabilities)—in the ordered set of vulnerabilities—exhibiting greatest quantities of devices.

In response to identifying the first subset of vulnerabilities including the second vulnerability, the computer system can generate the first visualization indicating, for each vulnerability in the first subset of vulnerabilities: the vulnerability; and the quantity of assets associated with the vulnerability. More specifically, the computer system can generate the first visualization indicating the second vulnerability and the second quantity of devices associated with the second vulnerability.

Therefore, by identifying a subset of vulnerabilities related to the first vulnerability and quantities of devices associated with each vulnerability in the subset of vulnerabilities, the computer system enables the operator to visualize relationships (or trends) between these vulnerabilities in order to identify underlying issues impacting these devices and to execute actions that remediate or mitigate multiple vulnerabilities.

9. Asset Count Change

In one implementation, the computer system executes the foregoing methods and techniques: to store attributes represented in objects—generated by a set of sources during a first time interval—in a set of asset containers associated with a first set of assets (e.g., devices, users, applications); to access a first combination of attributes defining a first vulnerability in a first set of vulnerabilities; to identify a first subset of assets, in the first set of assets, associated with the first vulnerability based on the first combination of attributes represented sets of attributes stored in the asset containers associated with the first subset of assets; to calculate a first quantity of assets in the first subset of assets associated with the first vulnerability; and to generate a first visualization indicating the first vulnerability and the first quantity of assets associated with the first vulnerability.

In this implementation, the computer system repeats the foregoing methods and techniques: to access a second set of objects, generated by the set of sources during a second time interval succeeding the first time interval, representing attributes of a second set of assets (e.g., devices, users, applications) affiliated with the computer network; to group the second set of objects into a second set of object groups including a second object group representing the first asset; to store attributes represented in objects in the second object group into a first asset container (e.g., a device container), in the set of asset containers, storing a second set of attributes characterizing the first asset during the second time interval; to identify a second subset of assets, in the second set of assets and including the first asset, associated with the first vulnerability based on the first combination of attributes represented in the second set of attributes; to calculate a second quantity of assets in the second subset of assets associated with the first vulnerability; to generate a second visualization indicating the first vulnerability and the second quantity of assets associated with the first vulnerability during the second time interval; and to serve the second visualization to the operator via the operator interface.

In another implementation, the computer system: calculates a first value—representing a change (e.g., an addition, a reduction) in quantity of assets associated with the first vulnerability between the first time interval and the second time interval—based on a difference between the second quantity of assets and the first quantity of assets; and generates the second visualization representing the first value.

More specifically, the computer system can: identify a third subset of assets in the first subset of assets and absent from the second subset of assets; and calculate a third quantity of assets—in the third subset of assets—representing assets newly absent the first vulnerability during the second time interval.

Additionally, the computer system can: identify a fourth subset of assets in the second subset of assets and absent from the first subset of assets; and calculate a fourth quantity of assets—in the fourth subset of assets—representing assets newly associated with the first vulnerability during the second time interval.

In this implementation, the computer system generates the second visualization indicating: the first vulnerability; the second quantity of assets associated with the first vulnerability during the second time interval; the first value representing the change in quantity of assets associated with the first vulnerability between the second time interval and the first time interval; the third quantity of assets newly absent the first vulnerability during the second time interval; and the fourth quantity of assets newly associated with the first vulnerability during the second time interval.

Therefore, the computer system can indicate to the operator: the third quantity of assets newly absent the first vulnerability during the second time interval; the fourth quantity of assets newly associated with the first vulnerability during the second time interval; and a net change in quantity assets—attributed to the third quantity of assets and the fourth quantity of assets—associated with the first vulnerability between the first time interval and the second time interval, thereby enabling the operator to track reduction (or increase) of the first vulnerability relative to individual assets and to all assets in the computer network.

The computer system repeats the foregoing methods and techniques for each vulnerability in the subset of vulnerabilities.

9.1 Example

In one example, the computer system executes the foregoing methods and techniques: to store attributes represented in objects—generated by a set of sources during a first time interval—in a set of device containers associated with a first set of devices; to access a first combination of attributes defining a first vulnerability in a first set of vulnerabilities; to identify a first subset of devices, in the first set of devices, associated with the first vulnerability based on the first combination of attributes represented sets of attributes stored in the device containers associated with the first subset of devices; and to calculate a first quantity of devices (e.g., 919 devices) in the first subset of devices associated with the first vulnerability.

In this example, the computer system repeats the foregoing methods and techniques: to access a second set of objects, generated by the set of sources during a second time interval succeeding the first time interval, representing attributes of a second set of devices affiliated with the computer network; to group the second set of objects into a second set of object groups including a second object group representing the first device; to store attributes represented in objects in the second object group into a first device container, in the set of device containers, storing a second set of attributes characterizing the first device during the second time interval; to identify a second subset of devices, in the second set of devices and including the first device, associated with the first vulnerability based on the first combination of attributes represented in the second set of attributes; and to calculate a second quantity of devices (e.g., 789 devices) in the second subset of devices associated with the first vulnerability.

Additionally, the computer system: calculates a first value (e.g., −130)—representing a reduction in quantity of devices associated with the first vulnerability between the second time interval and the first time interval—based on a difference between the second quantity of devices and the first quantity of devices; identifies a third subset of devices in the first subset of devices and absent from the second subset of devices; calculates a third quantity of devices (e.g., 600 devices), in the third subset of devices, representing devices newly absent the first vulnerability during the second time interval; identifies a fourth subset of devices in the second subset of devices and absent from the first subset of devices; and calculate a fourth quantity of devices (e.g., 470 devices), in the fourth subset of devices, representing devices newly associated with the first vulnerability during the second time interval.

The computer system generates a visualization indicating: the first vulnerability; the second quantity of devices associated with the first vulnerability during the second time interval; the first value representing the change in quantity of devices associated with the first vulnerability between the second time interval and the first time interval; the third quantity of devices newly absent the first vulnerability during the second time interval; and the fourth quantity of devices newly associated with the first vulnerability during the second time interval.

The computer system serves the visualization to the operator via the operator interface.

9.2 Vulnerability Aging Trend

In another implementation, the computer system executes the foregoing methods and techniques: to identify a first subset of assets (e.g., devices, users, applications) associated with a first vulnerability for a first time interval; to calculate a first quantity of assets in the first subset of assets associated with the first vulnerability; to identify a second subset of assets associated with the first vulnerability for a second time interval succeeding the first time interval; to calculate a second quantity of assets in the second subset of assets associated with the first vulnerability; to identify a third subset of assets in the second subset of assets and absent from the first subset of assets; and to calculate a third quantity of assets in the third subset of assets and representing assets newly associated with the first vulnerability during the second time interval.

In this implementation, the computer system executes the foregoing methods and techniques to identify a fourth subset of assets, in the second subset of assets associated with the first vulnerability for the second time interval, exhibiting a target status relative to the first vulnerability for a duration exceeding a predefined threshold duration (and identified as violating policy associated with the first vulnerability). The computer system calculates a fifth quantity of assets in the fourth subset of assets.

Figures 3E, 3F:
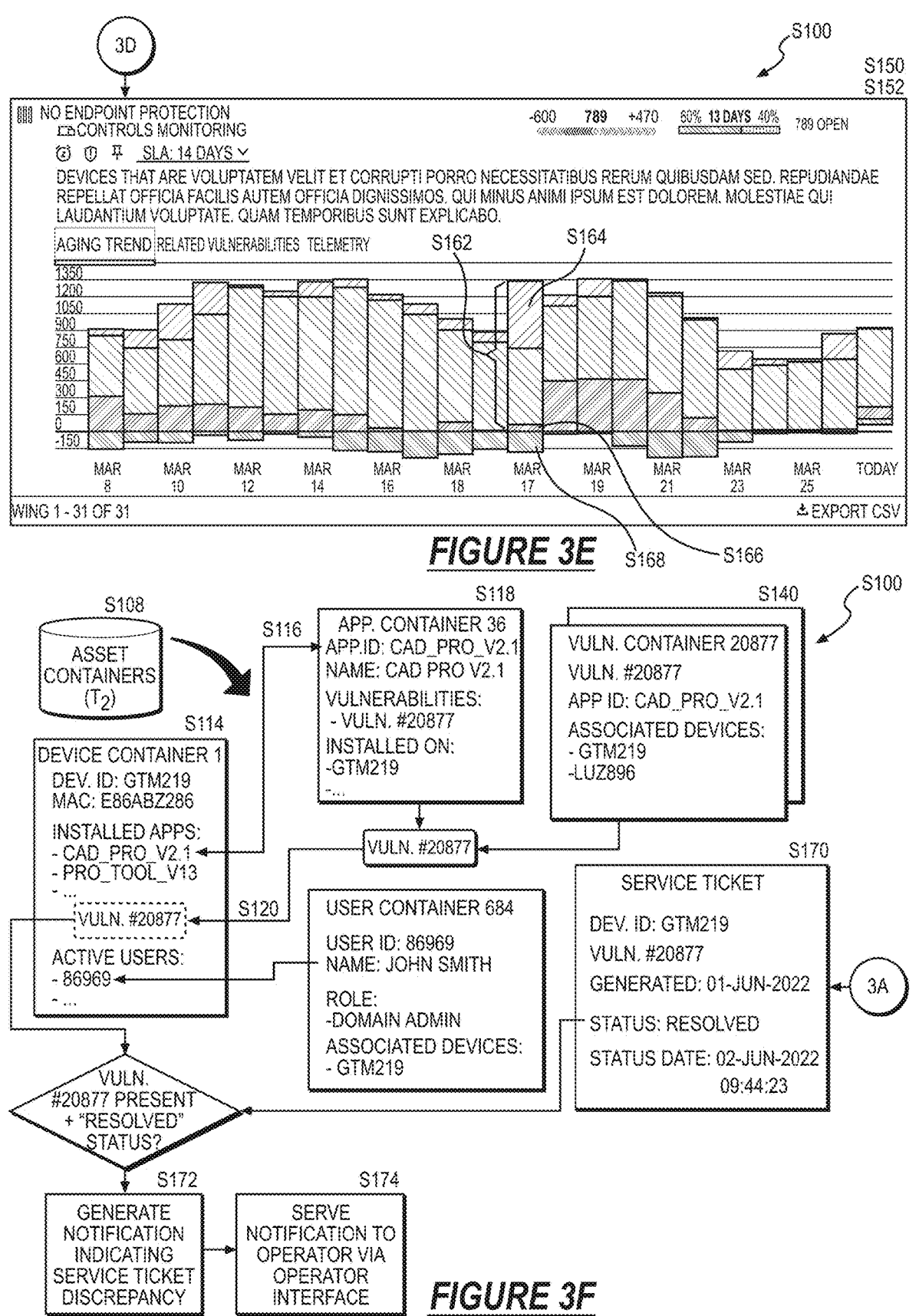

As shown in FIG. 3E, the computer system generates the visualization including: a first area (e.g., a first bar in a bar chart) representing the second quantity of assets associated with the first vulnerability during the second time interval in Block S162; a second area, within the first area, representing the third quantity of assets newly associated with the first vulnerability during the second time interval in Block S164; and a third area, within the first area and outside the second area, representing the fourth quantity of assets associated with the first vulnerability and exhibiting the target status relative to the first vulnerability for the duration exceeding the predefined threshold duration in Block S166.

Additionally, the computer system can execute the foregoing methods and techniques: to identify a fifth subset of assets in the first subset of assets and absent from the second subset of assets; and to calculate a fifth quantity of assets in the fifth subset of assets and representing assets newly absent the first vulnerability during the second time interval in Block S168. Then, the computer system can generate the visualization including a fourth area representing the fifth quantity of assets in the fifth subset of assets and representing assets newly associated with the first vulnerability during the second time interval.

The computer system can repeat the foregoing methods and techniques for each time interval in a series of time intervals.

9.3 Action Validation

Blocks of the method S100 recite: accessing a first electronic service ticket associated with the first device and the first vulnerability, the first electronic service ticket indicating resolution of the first vulnerability relative to the first device in Block S170; in response to identifying the second subset of devices including the first device, generating a notification indicating discrepancy between the first electronic service ticket, indicating resolution of the first vulnerability associated with the first device, and the second subset of devices associated with the first vulnerability for the second time interval in Block S172; and serving the notification to the operator via the operator interface in Block S174.

In one implementation, the computer system executes the foregoing methods and techniques: to access a second set of objects, generated by the set of sources during a second time interval succeeding the first time interval, representing attributes of a second set of assets (e.g., devices, users, applications) affiliated with the computer network; to group the second set of objects into a second set of object groups including a second object group representing the first asset; to store attributes represented in objects in the second object group into a first asset container, in the set of asset containers, storing a second set of attributes characterizing the first asset during the second time interval; to access a first combination of attributes defining a first vulnerability; and to identify a second subset of assets, in the second set of assets and including a first asset (e.g., a first device), associated with the first vulnerability based on the first combination of attributes represented in the second set of attributes.

In this implementation, as shown in FIG. 3F, in response to identifying the first asset as associated with the first vulnerability based on the first combination of attributes represented in the second set of attributes, the computer system accesses a first electronic service ticket associated with the first asset and the first vulnerability in Block S170, the first electronic service ticket indicating resolution of the first vulnerability relative to the first asset. For example, the computer system can access the first electronic service ticket indicating a "resolved" status of the first asset relative to the first vulnerability.

In response to identifying the second subset of assets including the first asset and, in response to the first electronic service ticket indicating resolution of the first vulnerability associated with the first asset, the computer system: generates a notification indicating discrepancy between the first electronic service ticket—indicating resolution of the first vulnerability relative to the first asset—and the second subset of assets associated with the first vulnerability for the second time interval in Block S172; and serves the notification to the operator via the operator interface in Block S174.

Therefore, the computer system identifies the first asset as associated with the first vulnerability despite the first electronic service ticket indicating resolution of the first vulnerability relative to the first asset, thereby enabling the operator to investigate the first electronic service ticket and/or the first asset in order to reconcile this discrepancy.

10. Action Prioritization by Composite Risk Score

In one implementation, for each vulnerability in a set of vulnerabilities exhibited in the computer network, the computer system can: access a current composite risk score for the computer network; identify an action (or a set of actions) to remediate or mitigate the vulnerability; recalculate a subset of asset risk scores—in a set of asset risk scores—of a subset of devices based on the action on the subset of devices; calculate a projected composite risk score based on the set of asset risk scores; and calculate a difference (or "impact score") between the projected composite risk score and the current composite risk score, the difference quantifying an impact of the action to reduce overall risk in the computer network.

In one example, the computer system can access a current composite risk score (e.g., 1,000) for the computer network. For a first vulnerability (e.g., a "low" severity software bug exhibiting a severity score of "1") in a set of vulnerabilities exhibited by the computer network, the computer system can: identify a first action (e.g., software update) to remediate the first vulnerability; recalculate a first subset of asset risk scores—in a set of asset risk scores—of a first subset of devices (e.g., 300 devices exhibiting the first vulnerability) based on the first action on the first subset of devices; calculate a first projected composite risk score (e.g., 700) based on the set of asset risk scores; and calculate a first impact score (e.g., 300) characterized by a first difference between the first projected composite risk score and the current composite risk score.

In this example, for a second vulnerability (e.g., a "critical" severity software bug exhibiting a severity score of "10") in the set of vulnerabilities, the computer system can: identify a second action (e.g., software update) to remediate the second vulnerability; recalculate a second subset of asset risk scores—in the set of asset risk scores—of a second subset of devices (e.g., one device exhibiting the second vulnerability) based on the second action on the second subset of devices; calculate a second projected composite risk score (e.g., 990) based on the set of asset risk scores; and calculate a second impact score (e.g., 10) characterized by a second difference between the second projected composite risk score and the current composite risk score.

Accordingly, by calculating the first impact score exceeding the second impact score, the computer system can identify the first action as yielding a larger reduction to a composite risk score of the computer network, thereby enabling the computer system to prioritize the first action over the second action and more effectively manage resources in the computer network.

In another implementation, for each action in a set of actions to remediate or mitigate a set of vulnerabilities exhibited by the computer network, the computer system can: rank the action based on an impact score characterized by a difference between a projected composite risk score—responsive to the action to remediate or mitigate a vulnerability—and the current composite risk score; order the set of actions according to rank as an ordered set of actions; and serve the ordered set of actions, or a subset of actions in the ordered set of actions (e.g., first ten actions in the ordered set of actions) at an operator portal.

Accordingly, the computer system can prompt an operator with a curated list of actions to remediate or mitigate vulnerabilities exhibited by the computer network and yielding largest reductions to a composite risk score of the computer network, thereby enabling an operator to prioritize actions effecting largest impact on reducing risk in the computer network.

Additionally or alternatively, the computer system can automatically execute the subset of actions in the ordered set of actions.

10.1 Visualization & Impact

In one implementation, the computer system can identify a set of devices exhibiting a first vulnerability (e.g., software bug exhibiting a severity score of "5"), the set of devices (e.g., 100 devices) including: a first subset of devices on which an action (e.g., software update)—to remediate or mitigate the first vulnerability—is available to be executed (e.g., 25 devices online and available for update); and a second subset of devices on which the action is unavailable to be executed (e.g., 75 devices offline or unavailable for update). The system can: calculate a first ideal impact score (e.g., "500") characterized by a first difference between a first projected composite risk score, responsive to the action on the set of devices, and a baseline composite risk score; and calculate a first effective impact score (e.g., "125") characterized by a second difference between a second projected composite risk score—responsive to the action on the first subset of devices—and the baseline composite risk score.

In this implementation, the computer system can generate a visualization depicting: the first subset of devices; the second subset of devices; the first ideal impact score representing a maximum impact of the action on reducing a composite risk score; and the first effective impact score representing a current impact of the action (based on the first subset of devices on which the action is available to be executed) on reducing the composite risk score. The computer system can serve the visualization at an operator portal.

Additionally, the computer system can serve the visualization specifying an alternative action associated with: a second ideal impact score (e.g., 400) falling below the first ideal impact score; and a second effective impact score (e.g., 300) exceeding the first effective impact score based on a third subset of assets on which the alternative action is available to be executed.

Accordingly, by calculating and indicating effective impact scores for actions based on subsets of devices on which these actions are available to be executed, the computer system can thereby prompt an operator to initiate an action yielding the greatest reduction of overall risk in the computer network based on devices currently available to execute the action.

11. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
accessing a first set of objects, generated by a set of sources during a first time interval, representing attributes of a first set of assets affiliated with a computer network, the first set of assets comprising a first set of devices;
grouping the first set of objects into a first set of object groups comprising a first object group representing a first device in the first set of devices;
storing attributes represented in objects in the first object group into a first device container in a set of device containers, the first device container storing a first set of attributes characterizing the first device during the first time interval;
accessing a first combination of attributes defining a first vulnerability in a first set of vulnerabilities;
identifying a first subset of devices, in the first set of devices and comprising the first device, associated with the first vulnerability based on the first combination of attributes represented in the first set of attributes;
calculating a first quantity of devices in the first subset of devices associated with the first vulnerability;
calculating a first vulnerability risk score, in a first set of vulnerability risk scores associated with the first set of vulnerabilities, associated with the first vulnerability based on the first quantity of devices and a first severity score assigned to the first vulnerability;
selecting a first subset of vulnerabilities, in the first set of vulnerabilities, exhibiting highest vulnerability risk score in the first set of vulnerability risk scores;
generating a first visualization indicating:
the first subset of vulnerabilities comprising the first vulnerability; and
the first quantity of devices associated with the first vulnerability; and
serving the first visualization to an operator via an operator interface.

2. The method of claim 1, further comprising:
accessing a second set of objects, generated by the set of sources during a second time interval succeeding the first time interval, representing attributes of a second set of devices affiliated with the computer network;
grouping the second set of objects into a second set of object groups comprising a second object group representing the first device;
storing attributes represented in objects in the second object group into the first device container, the first device container storing a second set of attributes characterizing the first device during the second time interval;
identifying a second subset of devices, in the second set of devices and comprising the first device, associated with the first vulnerability based on the first combination of attributes represented in the second set of attributes;
calculating a second quantity of devices in the second subset of devices associated with the first vulnerability;
generating a second visualization indicating:
the first vulnerability; and
the second quantity of devices associated with the first vulnerability during the second time interval; and
serving the second visualization to the operator via the operator interface.

3. The method of claim 2, wherein generating the second visualization comprises:
identifying a third subset of devices in the first subset of devices and absent from the second subset of devices;
calculating a third quantity of devices in the third subset of devices representing devices newly absent the first vulnerability during the second time interval;
identifying a fourth subset of devices in the second subset of devices and absent from the first subset of devices;
calculating a fourth quantity of devices in the fourth subset of devices representing devices newly associated with the first vulnerability during the second time interval; and
generating the second visualization indicating:
the first vulnerability;
the second quantity of devices associated with the first vulnerability during the second time interval;
the third quantity of devices newly absent the first vulnerability during the second time interval; and
the fourth quantity of devices newly associated with the first vulnerability during the second time interval.

4. The method of claim 2, wherein generating the second visualization comprises:
identifying a third subset of devices in the second subset of devices and absent from the first subset of devices;
calculating a third quantity of devices in the third subset of devices representing devices newly associated with the first vulnerability during the second time interval;
identifying a fourth subset of devices in the second subset of devices, each device in the fourth subset of devices exhibiting a target status relative to the first vulnerability for a duration exceeding a predefined threshold duration;
calculating a fourth quantity of devices in the fourth subset of devices; and
generating the second visualization including:
a first area representing the second quantity of devices associated with the first vulnerability during the second time interval;
a second area, within the first area, representing the third quantity of devices newly associated with the first vulnerability during the second time interval; and
a third area, within the first area and outside the second area, representing the fourth quantity of devices associated with the first vulnerability and exhibiting the target status relative to the first vulnerability for the duration exceeding the predefined threshold duration.

5. The method of claim 2, further comprising:
accessing a first electronic service ticket associated with the first device and the first vulnerability, the first electronic service ticket indicating resolution of the first vulnerability associated with the first device;
in response to identifying the second subset of devices comprising the first device, generating a notification indicating discrepancy between the first electronic service ticket, indicating resolution of the first vulnerability associated with the first device, and the second subset of devices relative to the first vulnerability for the second time interval; and serving the notification to the operator via the operator interface.

6. The method of claim 1, further comprising generating a first vulnerability container storing a second set of attributes characterizing the first vulnerability during the first time interval, the second set of attributes comprising:

a first attribute representing the first combination of attributes defining the first vulnerability;

a second attribute representing the first severity score assigned to the first vulnerability;

a third attribute representing the first subset of devices associated with the first vulnerability during the first time interval; and a fourth attribute representing the first quantity of devices associated with the first vulnerability during the first time interval.

7. The method of claim 1, wherein generating the first visualization comprises:

accessing a second combination of attributes defining a second vulnerability in the first set of vulnerabilities;

identifying a second subset of devices, in the first set of devices and comprising the first device, associated with the second vulnerability based on the second combination of attributes represented in the first set of attributes;

calculating a first asset risk score, in a first set of asset risk scores, for the first device based on the first severity score assigned to the first vulnerability and a second severity score assigned to the second vulnerability;

generating a first list of the first subset of devices associated with the first vulnerability during the first time interval;

ordering the first list of the first subset of devices, as a first ordered list of devices, based on the first set of asset risk scores; and generating the first visualization indicating the first ordered list of devices associated with the first vulnerability during the first time interval.

8. The method of claim 1:

wherein accessing the first combination of attributes comprises defining the first combination of attributes and the first severity score based on input via the operator interface, the first combination of attributes comprising:

a first subcombination of attributes associated with devices in the first set of assets; and a second subcombination of attributes associated with users in the first set of assets; and wherein identifying the first subset of devices comprises identifying the first subset of devices associated with the first vulnerability based on the first subcombination of attributes represented in the first set of attributes and the second subcombination of attributes represented in a second set of attributes characterizing a first user associated with the first device.

9. The method of claim 8, wherein identifying the first subset of devices comprises:

generating a first database query comprising:

a first operation representing the first subcombination of attributes; and a second operation representing the second subcombination of attributes; and identifying the first subset of devices associated with the first vulnerability in response to executing the first database query.

10. The method of claim 1:

wherein accessing the first combination of attributes comprises defining the first combination of attributes and the first severity score based on threat intelligence associated with a first application in the first set of assets, the first combination of attributes comprising a first attribute representing a first identifier of the first application; and wherein identifying the first subset of devices comprises identifying the first subset of devices associated with the first vulnerability based on a second attribute, in the first set of attributes, representing the first application installed on the first device, represented in the first set of attributes.

11. The method of claim 1, wherein identifying first subset of devices comprises:

identifying a first association between the first device and a first user in the first set of assets based on the first set of attributes;

accessing a second set of attributes, from a first user container in a set of user containers, characterizing the first user during the first time interval;

based on the first association between the first device and the second user, associating the first device with a first subset of attributes in the second set of attributes; and identifying the first subset of devices associated with the first vulnerability based on the first combination of attributes represented in:

the first set of attributes; and the first subset of attributes, in the second set of attributes, associated with the first device.

12. The method of claim 1, wherein generating the first visualization comprises:

identifying a first subset of vulnerabilities in the first set of vulnerabilities associated with devices in the first subset of devices;

identifying a second subset of devices in the first subset of devices associated with a second vulnerability in the first subset of vulnerabilities;

calculating a second quantity of devices in the first subset of devices associated with the second vulnerability; and generating the first visualization indicating the second vulnerability and the second quantity of devices associated with the second vulnerability.

13. The method of claim 1, wherein calculating the first vulnerability risk score comprises:

accessing the first device container storing the first set of attributes comprising a first attribute identifying a first user associated with the first device;

accessing a first user container storing a second set of attributes characterizing the first user during the first time interval, the second set of attributes comprising a second attribute defining a first role assigned to the first user;

accessing a first weight assigned to the first role; and calculating the first vulnerability risk score based on:

the first quantity of devices;

the first severity score assigned to the first vulnerability; and the first weight assigned to the first role.

14. The method of claim 13, wherein calculating the first vulnerability risk score comprises calculating the first vulnerability risk score based on the first weight assigned to the first role comprising an administrator role.

15. A non-transitory computer readable medium storing instructions that, when executed by a processor, cause the processor to:

access a first set of objects, generated by a set of sources during a first time interval, representing attributes of a first set of assets affiliated with a computer network, the first set of assets comprising a first set of devices;

group the first set of objects into a first set of object groups comprising a first object group representing a first device in the first set of devices;

store attributes represented in objects in the first object group into a first device container in a set of device containers, the first device container storing a first set of attributes characterizing the first device during the first time interval;

access a first combination of attributes defining a first vulnerability in a first set of vulnerabilities;

identify a first subset of devices, in the first set of devices and comprising the first device, associated with the first vulnerability based on the first combination of attributes represented in the first set of attributes;

calculate a first quantity of devices in the first subset of devices associated with the first vulnerability;

calculate a first vulnerability risk score, in a first set of vulnerability risk scores associated with the first set of vulnerabilities, associated with the first vulnerability based on the first quantity of devices and a first severity score assigned to the first vulnerability;

select a first subset of vulnerabilities, in the first set of vulnerabilities, exhibiting highest vulnerability risk score in the first set of vulnerability risk scores;

generate a first visualization indicating:

the first subset of vulnerabilities comprising the first vulnerability; and the first quantity of devices associated with the first vulnerability; and serve the first visualization to an operator via an operator interface.

16. The non-transitory computer readable medium of claim 15, wherein the non-transitory computer readable medium stores instructions that, when executed by the processor, cause the processor to:

access a second set of objects, generated by the set of sources during a second time interval succeeding the first time interval, representing attributes of a second set of devices affiliated with the computer network;

group the second set of objects into a second set of object groups comprising a second object group representing the first device;

store attributes represented in objects in the second object group into the first device container, the first device container storing a second set of attributes characterizing the first device during the second time interval;

identify a second subset of devices, in the second set of devices and comprising the first device, associated with the first vulnerability based on the first combination of attributes represented in the second set of attributes;

calculate a second quantity of devices in the second subset of devices associated with the first vulnerability;

generate a second visualization indicating:

the first vulnerability; and the second quantity of devices associated with the first vulnerability during the second time interval; and serve the second visualization to the operator via the operator interface.

17. The non-transitory computer readable medium of claim 15, wherein the non-transitory computer readable medium stores instructions that, when executed by the processor, cause the processor to:

access a second combination of attributes defining a second vulnerability in the first set of vulnerabilities;

identify a second subset of devices, in the first set of devices and comprising the first device, associated with the second vulnerability based on the second combination of attributes represented in the first set of attributes;

calculate a first asset risk score, in a first set of asset risk scores, for the first device based on the first severity score assigned to the first vulnerability and a second severity score assigned to the second vulnerability;

generate a first list of the first subset of devices associated with the first vulnerability during the first time interval;

order the first list of the first subset of devices, as a first ordered list of devices, based on the first set of asset risk scores; and generate the first visualization indicating the first ordered list of devices associated with the first vulnerability during the first time interval.

18. The non-transitory computer readable medium of claim 15, wherein the non-transitory computer readable medium stores instructions that, when executed by the processor, cause the processor to:

define the first combination of attributes and the first severity score based on input via the operator interface, the first combination of attributes comprising:

a first subcombination of attributes associated with devices in the first set of assets; and a second subcombination of attributes associated with users in the first set of assets; and identify the first subset of devices associated with the first vulnerability based on the first subcombination of attributes represented in the first set of attributes and the second subcombination of attributes represented in a second set of attributes characterizing a first user associated with the first device.

19. The non-transitory computer readable medium of claim 15, wherein the non-transitory computer readable medium stores instructions that, when executed by the processor, cause the processor to:

identify a first subset of vulnerabilities in the first set of vulnerabilities associated with devices in the first subset of devices;

identify a second subset of devices in the first subset of devices associated with a second vulnerability in the first subset of vulnerabilities;

calculate a second quantity of devices in the first subset of devices associated with the second vulnerability; and generate the first visualization indicating the second vulnerability and the second quantity of devices associated with the second vulnerability.

20. A system comprising:

a processor; and a memory coupled to the processor, the memory storing instructions that, when executed by the processor, cause the processor to:

access a first set of objects, generated by a set of sources during a first time interval, representing attributes of a first set of assets affiliated with a computer network, the first set of assets comprising a first set of devices;

group the first set of objects into a first set of object groups comprising a first object group representing a first device in the first set of devices;

store attributes represented in objects in the first object
   group into a first device container in a set of device
   containers, the first device container storing a first set
   of attributes characterizing the first device during the
   first time interval;
access a first combination of attributes defining a first
   vulnerability in a first set of vulnerabilities;
identify a first subset of devices, in the first set of
   devices and comprising the first device, associated
   with the first vulnerability based on the first combi-
   nation of attributes represented in the first set of
   attributes;
calculate a first quantity of devices in the first subset of
   devices associated with the first vulnerability;
calculate a first vulnerability risk score, in a first set of
   vulnerability risk scores associated with the first set
   of vulnerabilities, associated with the first vulner-
   ability based on the first quantity of devices and a
   first severity score assigned to the first vulnerability;
select a first subset of vulnerabilities, in the first set of
   vulnerabilities, exhibiting highest vulnerability risk
   score in the first set of vulnerability risk scores;
generate a first visualization indicating:
   the first subset of vulnerabilities comprising the first
      vulnerability; and
   the first quantity of devices associated with the first
      vulnerability; and
serve the first visualization to an operator via an
   operator interface.

\* \* \* \* \*